(12) United States Patent
Datz et al.

(10) Patent No.: US 8,210,725 B2
(45) Date of Patent: Jul. 3, 2012

(54) LIGHT BAR

(75) Inventors: R. Michael Datz, Rochester, NY (US); Robert J. Gross, Rochester, NY (US); Steven W. Neufeglise, Rochester, NY (US); Stephen T. Vukosic, West Henrietta, NY (US); J. Douglas Richardson, Pittsford, NY (US); Michael F. Mastin, Livonia, NY (US)

(73) Assignee: Start Headlight & Lantern Co., Inc., Avon, NY (US)

( * ) Notice: Subject to any disclaimer, the term of this patent is extended or adjusted under 35 U.S.C. 154(b) by 486 days.

(21) Appl. No.: 12/378,247

(22) Filed: Feb. 12, 2009

(65) Prior Publication Data

US 2009/0207612 A1    Aug. 20, 2009

Related U.S. Application Data

(60) Provisional application No. 61/066,061, filed on Feb. 15, 2008.

(51) Int. Cl.
*B60Q 1/00* (2006.01)

(52) U.S. Cl. ......... 362/493; 362/496; 362/476; 362/549

(58) Field of Classification Search ............. 362/217.01, 362/217.14, 217.16, 219, 223–225, 227, 362/238, 240, 249.01, 249.14, 261, 346, 362/355, 455, 474, 487, 493, 477, 479, 509, 362/517, 540, 542–547, 35, 368, 390, 45, 362/5, 800
See application file for complete search history.

(56) References Cited

U.S. PATENT DOCUMENTS 4,189,709 A * 2/1980 Gosswiller .................. 340/472

(Continued)

OTHER PUBLICATIONS

Whelen Engineering Company, Inc., Edge Freedom FV & FW Series, WeCan Programmable Super-LED Lightbars, 2007.

(Continued)

*Primary Examiner* — Hargobind S Sawhney

(74) *Attorney, Agent, or Firm* — Kenneth J. Lukacher; Martin Lukacher

(57) ABSTRACT

A light bar has several modular light source heads which may contain different types of light sources as well as different technologies mounted in cages by shock absorbing grommets. The cages are mounted on a bottom member so that the heads can be arranged along opposite sides and the ends of the bottom members. The heads are captured, and assembled with the bottom member, by a top member which also captures translucent or transparent members or lenses along the sides of the light bar and, transparent or translucent end caps which may also provide lenses for the light source heads at the ends of the bar. The end caps are removably connected to the top and bottom members at the ends of the bar by screws extending through the end caps. The light source modules have the same wiring connected thereto by connectors from a connector board to connectors along the back ends of the light source heads. The top member is attached to posts extending from the bottom member by screws so as to enable removal of the top member to expose the light source modules. The modules at the end of the light bar are exposed upon removal of the end caps thereby permitting the light source modules to be installed, removed for servicing, and the interchange of different modular heads to obtain a desired compliment of light sources, which may be of different types and technologies, or may not be installed if desired to meet customers' orders.

6 Claims, 23 Drawing Sheets

U.S. PATENT DOCUMENTS

| | | | |
|---|---|---|---|
| D284,557 S | 7/1986 | Ferenc | |
| 4,620,268 A * | 10/1986 | Ferenc | 362/517 |
| 4,722,030 A * | 1/1988 | Bowden | 362/493 |
| 4,754,375 A | 6/1988 | Ferenc | |
| 4,928,216 A * | 5/1990 | Carr | 362/543 |
| 5,027,260 A | 6/1991 | Lyons et al. | |
| 5,452,188 A | 9/1995 | Green et al. | |
| 5,481,441 A * | 1/1996 | Stevens | 362/35 |
| 5,826,965 A | 10/1998 | Lyons | |
| 5,884,997 A * | 3/1999 | Stanuch et al. | 362/493 |
| 5,984,490 A * | 11/1999 | Leen | 362/240 |
| 6,140,918 A * | 10/2000 | Green et al. | 340/468 |
| 6,474,844 B1 * | 11/2002 | Ching | 362/285 |
| 6,508,578 B2 * | 1/2003 | Yoda et al. | 362/545 |
| 6,722,776 B1 * | 4/2004 | Lyons et al. | 362/493 |
| D491,482 S | 6/2004 | Chiang | |
| 7,249,875 B1 * | 7/2007 | Roach et al. | 362/496 |
| 7,476,013 B2 * | 1/2009 | Gergets et al. | 362/493 |

OTHER PUBLICATIONS

Whelen Engineering Company, Inc., LFL Liberty SW Series, WeCan Programmable Super-LED Lightbars, 2007.

Federal Signal Corporation, Legend, As Brilliant Inside As It Is Outside, 2007.

SoundOff Signal, ETL5000, The Choice is Finally Clear, LED Lightbars, 2007.

* cited by examiner

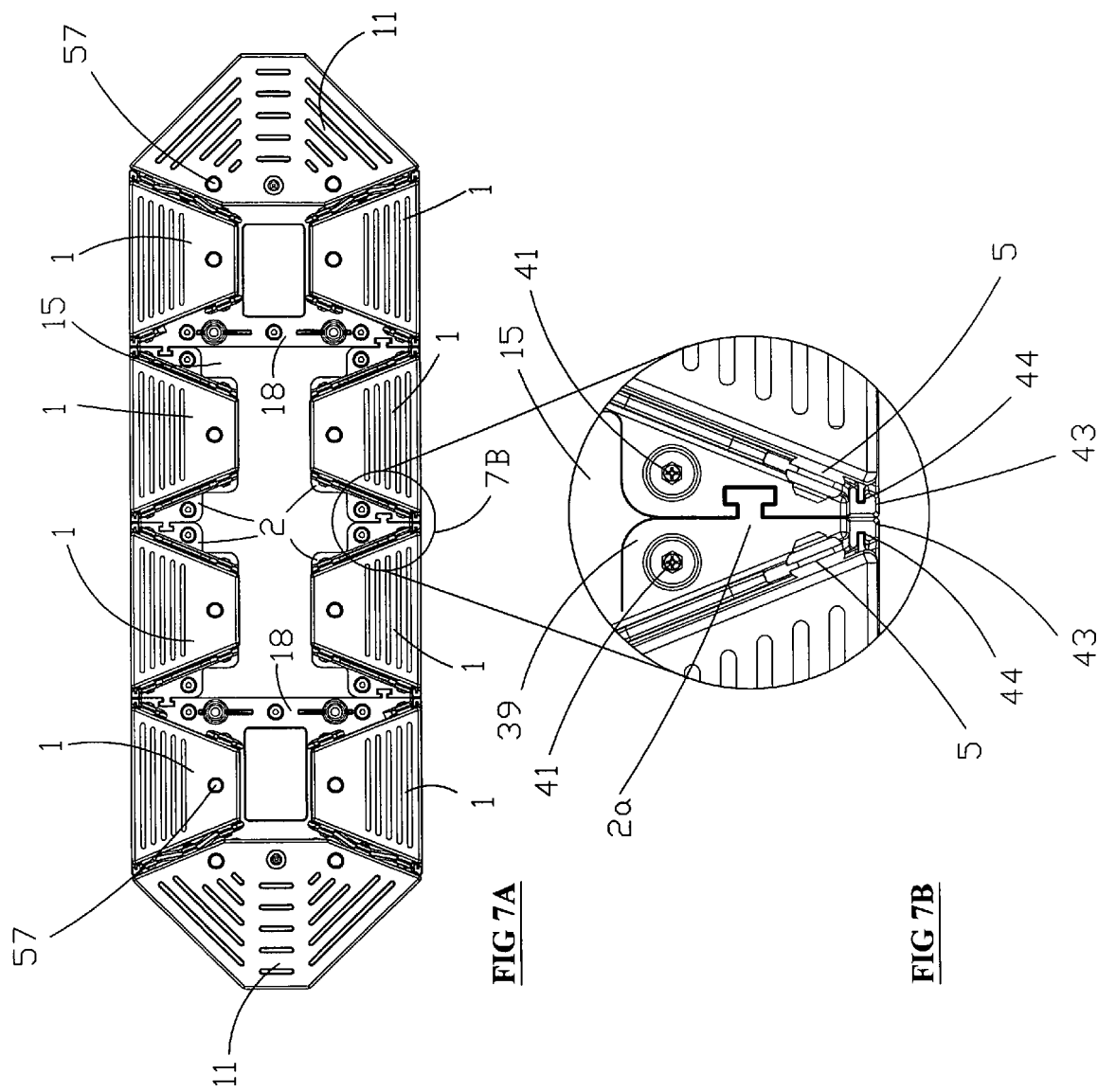

LIGHT BAR

Priority is claimed to U.S. Provisional Patent Application No. 61/066,061, filed Feb. 15, 2008.

DESCRIPTION

The present invention relates to light bars and particularly to light bars having modular light sources which may be of different types and which are readily accessible for installation and servicing, and which are interchangeable to provide compliments of light sources of different types, such as LED, strobe lamp, incandescent lamp and halogen as well as light sources having different reflectors, such as parabolic and collimating reflectors, or different lenses.

The invention is especially suitable in providing low profile light bars in which light sources are arranged along the sides and the ends of the bars. Such light bars are shown, for example, in Ferenc, U.S. Des. Pat. No. 284,557 dated Jul. 8, 1986, Ferenc, U.S. Pat. No. 4,620,268 issued Oct. 28, 1986, Ferenc, U.S. Pat. No. 4,754,375, issued Jun. 28, 1988, and Lyons et al., U.S. Pat. No. 6,722,776 dated Apr. 20, 2004. Other styles of light bars having light sources along the sides and ends are shown, for example, in Green, U.S. Pat. No. 5,452,188, issued Sep. 19, 1995, Lyons, U.S. Pat. No. 5,826,965, issued Oct. 27, 1998, Stanuch, U.S. Pat. No. 5,884,997, issued Mar. 23, 1999, and Lyons, U.S. Pat. No. 5,027,260, issued Jun. 25, 1991. Low profile light bars are also shown in Chiang, U.S. Des. Pat. No. 491,482, issued Jun. 15, 2004 and are commercially available from Whelen Engineering Company, Inc. and sold under the trade names "Edge", "Freedom" and "Liberty", from 911EP, Inc. and sold under the trade names "Galaxy", from Tomar Electronics, Inc. and sold under the trade names "930 and 930Blade" and, from Code 3 (Public safety equipment company) and sold under the trade name TX2500 from Sound Off Signal (Emergency Technology Inc.) and sold under the trade name "ETL5000" and by Federal Signal Corporation and sold under the trade name "Legend". Problems exist in the manufacture and servicing of such low profile light bars, in that their design requires the light bars to be completely disassembled in order to install light source units thereof and to enable such units to be removed for servicing such as the replacement of inoperative light bulbs. In addition, the contour of such low profile light bars can be essentially box like or rectangular so as to reduce interference with the flow of air over the light bars when they are mounted on vehicles such as police cars or other law enforcement vehicles, and provide a vehicle profile that is more difficult to discern such vehicle as being associated with law enforcement.

Another problem with such light bars of known design is that the location of the light sources therein is essentially fixed so that light sources of different types are designed to be in fixed locations on the light bar. It is desirable that the light sources be completely interchangeable so as to provide different types of light sources in different locations on the light bar. In other words, such known light bars do not have light sources which are independent from each other, even though the light sources may be themselves of modular design. For example, lack of complete interchangeability may be due to the need for power supplies and flasher circuits that are separate from the heads in such known light bars, and also wire harnesses are sometimes used which restrict rearrangement of the heads in the light bar.

Still another problem with such existing light bars is reliability of operation. Such bars use common power supplies and operating circuitry for all the light sources. Thus, the failure of a component, particularly a power supply, which may contain power transistors and other components which generate heat and are likely to fail, causes the entire light bar to fail.

It is a feature of the present invention to provide an improved light bar having modular light source units in which the foregoing problems and drawbacks are substantially eliminated.

A light bar provided by the invention features greater reliability by virtue of independent operability of the light sources in the compliment of light sources installed therein and also by shock mounting each module against shock and vibration which frequently occurs when the light bar is a portable or mobile unit, such as when mounted in or on a vehicle.

Another feature of the invention is to provide a light bar having modular and independent light source heads which may readily be installed and removed for repair or maintenance and which are interchangeable so as to enable light sources of different types (LED, Halogen, Strobe, etc.) and with different reflector configurations to be arranged in desired locations in the light bar and also to enable the light bar to be provided with or without certain light sources, if desired to meet customers' orders and also to enable the compliment of light sources and their location in the light bar to be interchanged in the field for example by sales distributors who sell the light bars to different customers.

Briefly described, a light bar in accordance with the invention contains a plurality of modular light source heads, which may be of different types. The light source heads include housings, which are connected by shock absorbing members of resilient material, which may be grommets and which mount the heads in cup shaped openings of cages. The cages are assembled to a bottom member, which may be an aluminum extrusion. The cages may be attached along the sides of the bottom member and at the ends thereof. Some of these cages have posts which extend upwardly from the bottom member, and to which a top member, which can be another aluminum extrusion, is attached to capture the light source heads between the bottom and top members. Transparent or translucent closure members, known as lenses, may be provided along the sides of the bottom member in front of the cages such that illumination from light source heads can extend through the closure members when such light source heads are present in cages. Such closure members are also captured by the top member. End caps of transparent and translucent material are connected by screws into the ends of the top and bottom members or to the cages at the ends of the bottom member. These end caps may be of transparent or translucent material and may also be referred to as lenses. By unscrewing and removing the top member, all of the light source heads are exposed and ready access thereto for repair or servicing is available, without disassembly of the entire light bar. The common wiring may be provided to each of the heads via connectors at the inside ends thereof. Since the wiring is common, and the modules are of similar shape, they are independent from each other and may be interchanged or installed at desired locations in the light bar cages.

The foregoing and other objects, features, and advantages of the invention will become more apparent from a reading of the following description in connection with the accompanying drawings in which:

FIG. 7A is a plan view of the internals of the light bar shown in FIG. 7;

FIG. 7B is an enlarged view showing the interconnections between adjacent cages in which side by side modular light source heads are mounted, the enlarged view being a fragmentary view within the circle marked "7B" in FIG. 7A;

Figure 8:
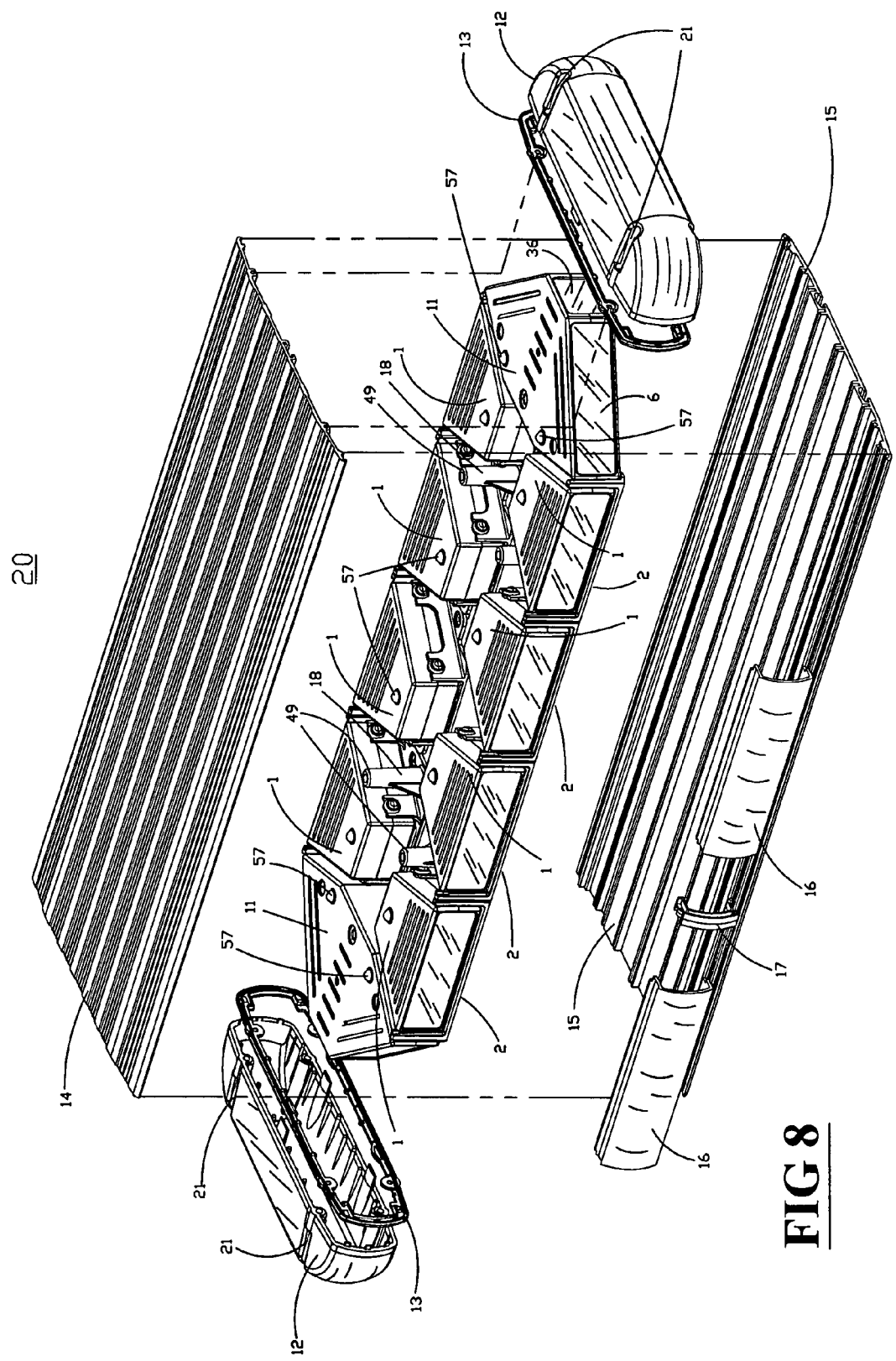
FIG. 8 is a simplified, perspective exploded view of the light bar utilizing the internals and the heads shown in FIGS. 7, 7A, and 7B.
Figure 9:
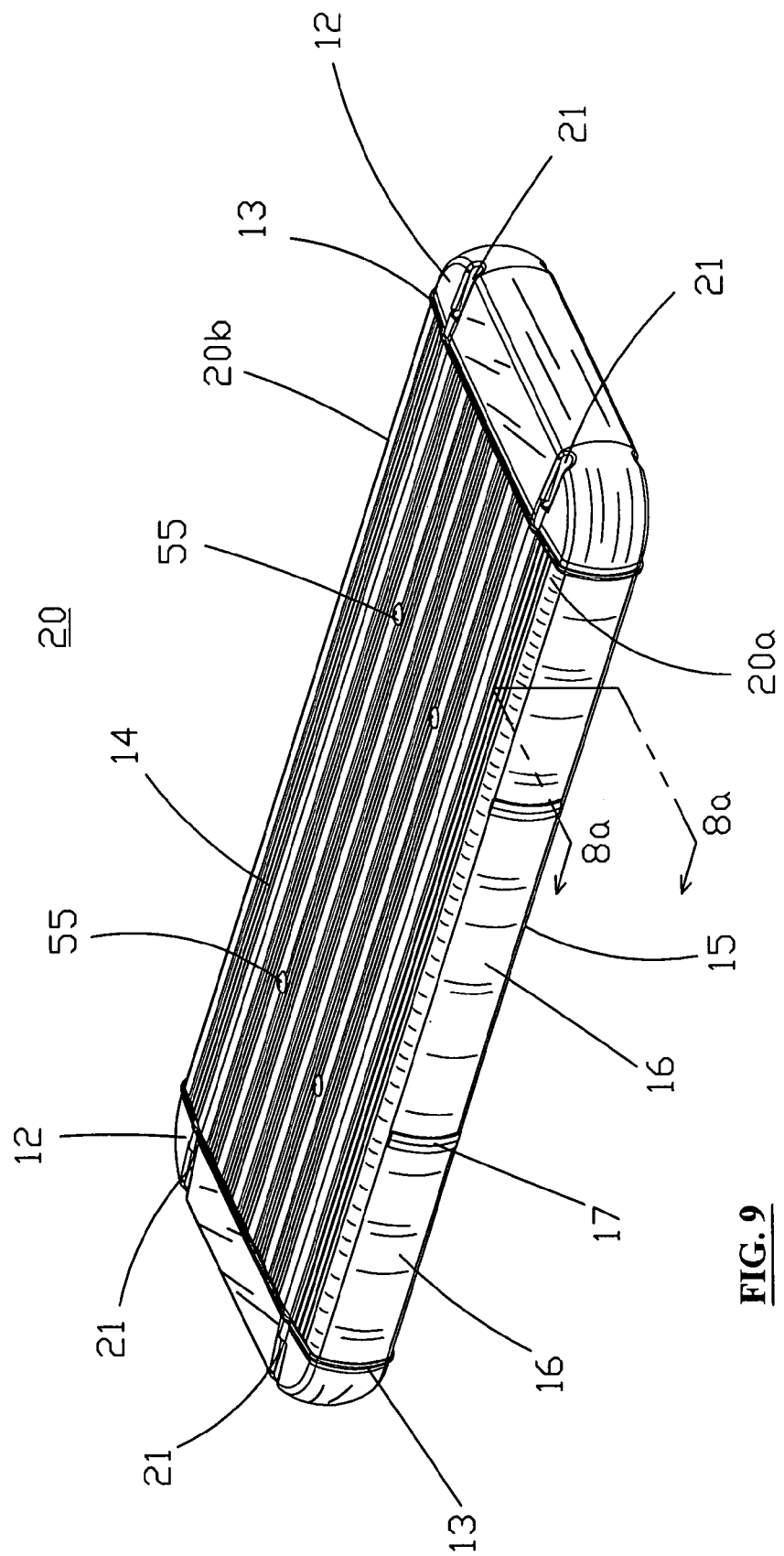
FIG. 9 is a perspective view of the light bar shown in FIG. 8 illustrating the ornamental configuration thereof, namely the contoured end caps, lenses, and top member.

Referring first to FIG. 9, a light bar 20 provided by the invention includes a top member 14 which is a plastic or aluminum extrusion and may be striated with stripes for strength, heat dissipation, or to provide mechanical attachment facilities. The light bar 20 also has multiple side lenses 16 assembled between clips 17. End caps 12 are attachable and removable from the top member 14 by four screws in each end cap, two of which extend through slots 21 in the top surfaces of the end caps and screw into the top member 14. Similar screws and slots are disposed in the bottom surface of the end caps 12 and screw into the bottom member (15—FIG. 8). Gaskets 13 provide seals between the edges of the end cap 12, the end edges of the lenses 16 along the sides of the light bar, and the top and bottom members 14 and 15, as may be more apparent from FIG. 8.

Surfaces of the light bar 20, including the forward and rear surfaces 20a and 20b (FIG. 9) of the top of the top member 14, the end caps 12, and the lenses 16 are all curved or streamlined for the sake of appearance. The ornamental design of the light bar 20 is the subject of a design patent application Ser. No. 29/301,211, filed Feb. 15, 2008 in the U.S. Patent and Trademark Office, and assigned to the same assignee as this application.

Figure 10:
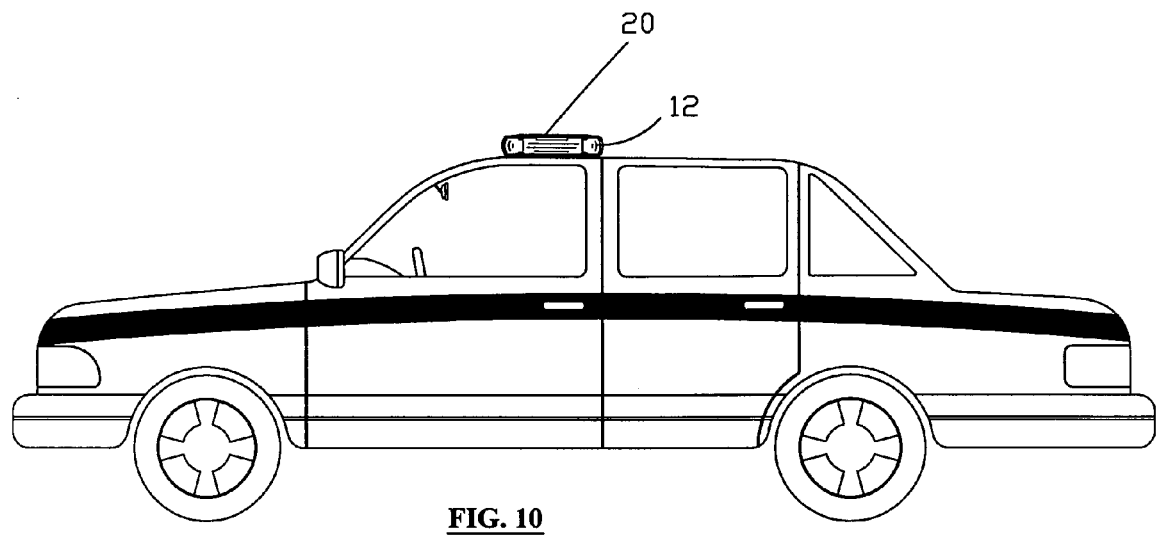
FIGS. 10 and 11 are side and front elevations of a vehicle having the light bar shown in FIG. 9 mounted on the roof thereof.
Figure 11:
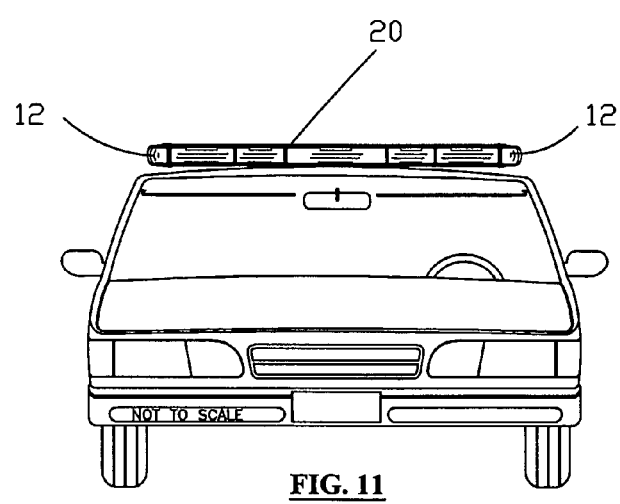

FIGS. 10 and 11 illustrate the light bar 20 mounted to provide a low profile light bar on the roof of an emergency vehicle. Brackets which connect to the bottom member are not shown for the sake of simplifying the illustration.

Figure 1:
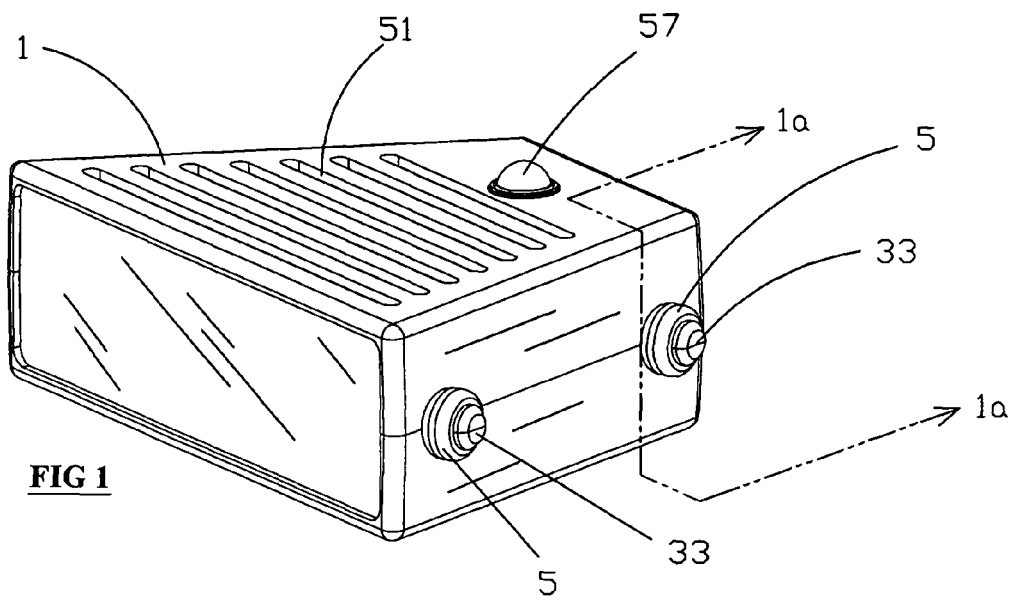
FIG. 1 is a perspective view of a modular light source in accordance with the invention.
Figure 3:
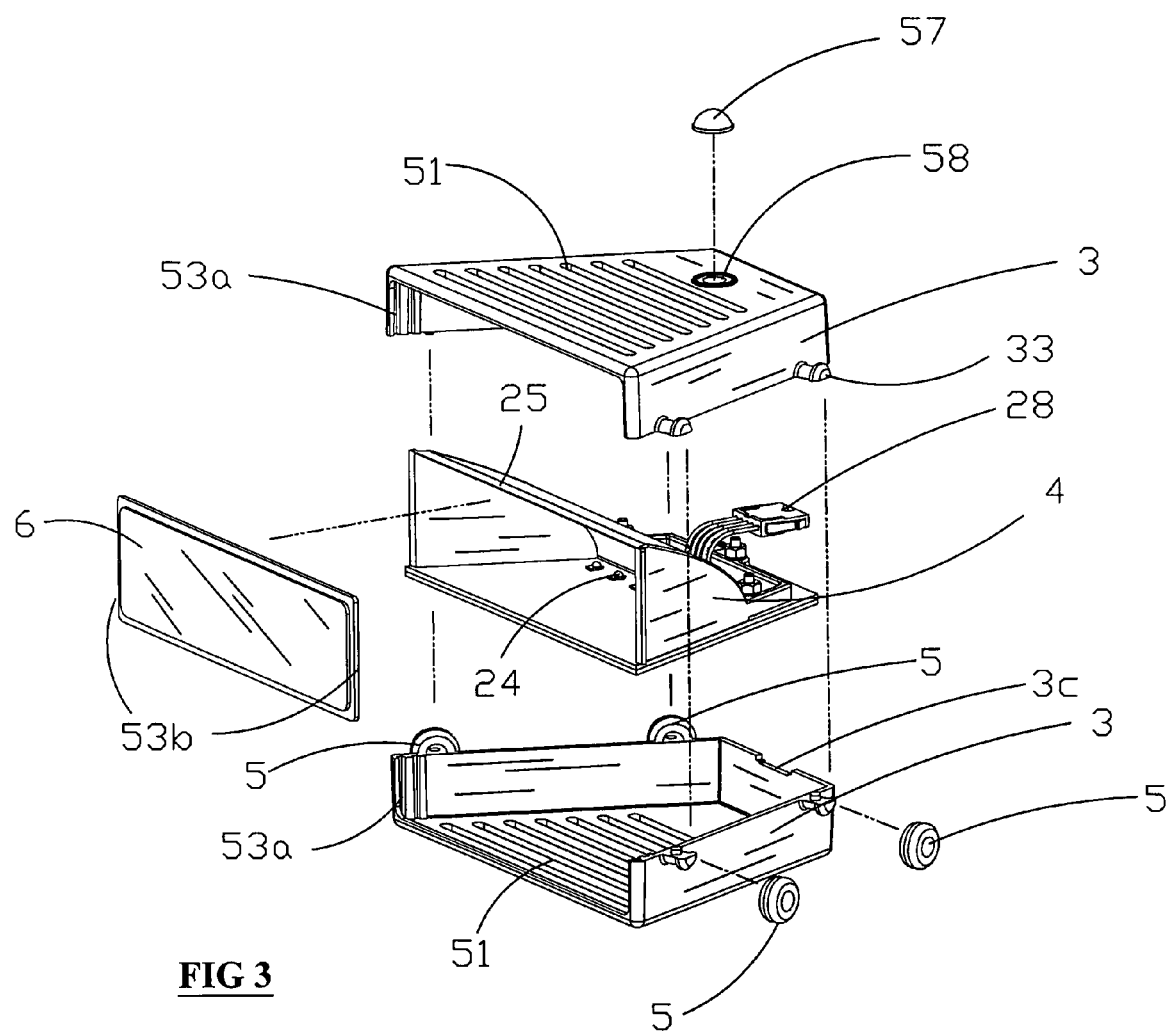
FIG. 3 is a perspective, exploded view showing a modular LED light source head with a parabolic reflector and the shell and front lens (which may be omitted)

Referring next to FIG. 1, there is shown a modular light source head 1. The internals of this source may be different for different types of light sources. The internal circuitry for operating same may also be different. Four different types of light sources 4, 8a, and 9a and a board 10a with an LED array source, are shown in FIGS. 3, 4, 5 and 6, respectively. In FIG. 3, for example, LED light source 4 has a row of LEDs 24 mounted inside a parabolic reflector housing 25. The circuitry for operating the source 4 is contained therein as an integral part thereof, and includes a power supply with converter circuits which powers the source as well as logic for turning the source on and off, changing the brightness of the light from the LEDs, synchronizing the operation of the source with other sources in the light bar, changing the flash pattern of the light source and include a single output to drive an adjacent head with an LED source. (See FIG. 6A).

Connections to the circuitry are by way of a connecter 28. This connector may be the same as the other light sources in the light bar. The connector connects to wires for providing the source with power, a ground connection, and an enable command turning the source on and off, a high/low command changing the intensity of the light from the LEDs, a pattern select command to select preset patterns of flashing of the LEDs, and a communications link for controlling synchronization with adjacent sources. Alternatively, high/low command may be embedded within the communication link and the high/low wire could provide an alternative feature such as takedown/worklight selection to allow light source to run in a steady burn mode. The power connections and the circuitry for generating the enable (on/off, high/low, pattern select, and links) is in a connector board 26 on the bottom or base member 15 of the light bar (see FIGS. 8B, 8C, 8D, 8E and 8F). The connector board 26 also has connectors of the self locking type 27, which are connected via jumpers to connectors 28 of each light source head 1. The connector for the light source 4 is shown in FIG. 3. These connectors are preferably of a self-locking type commercial connector. The circuitry in each module is similar and will be apparent from the functional block diagram shown in FIG. 6A. Each modular light source head has the same signal structure for command and control thereof.

The power and control cables (30, 31—FIG. 8E) for the light bar, for example from the vehicle to which the light bar 20 is mounted (see FIGS. 10 and 11), enters the bottom member 15 through a feed through openings 29a (FIGS. 8B-8D) and is connected to power and control cable connectors 29, 30a, and 30b on the connector board 26.

All the light sources 1 may use the same type of connector 28 and have the same compliment of wires (power, ground, enable, high/low select, pattern select, and communications link which constitutes the command and control signal structure). Accordingly, each head 1 is a module that is independent and interchangeable even though it may have a different type of light source.

Figure 1A:
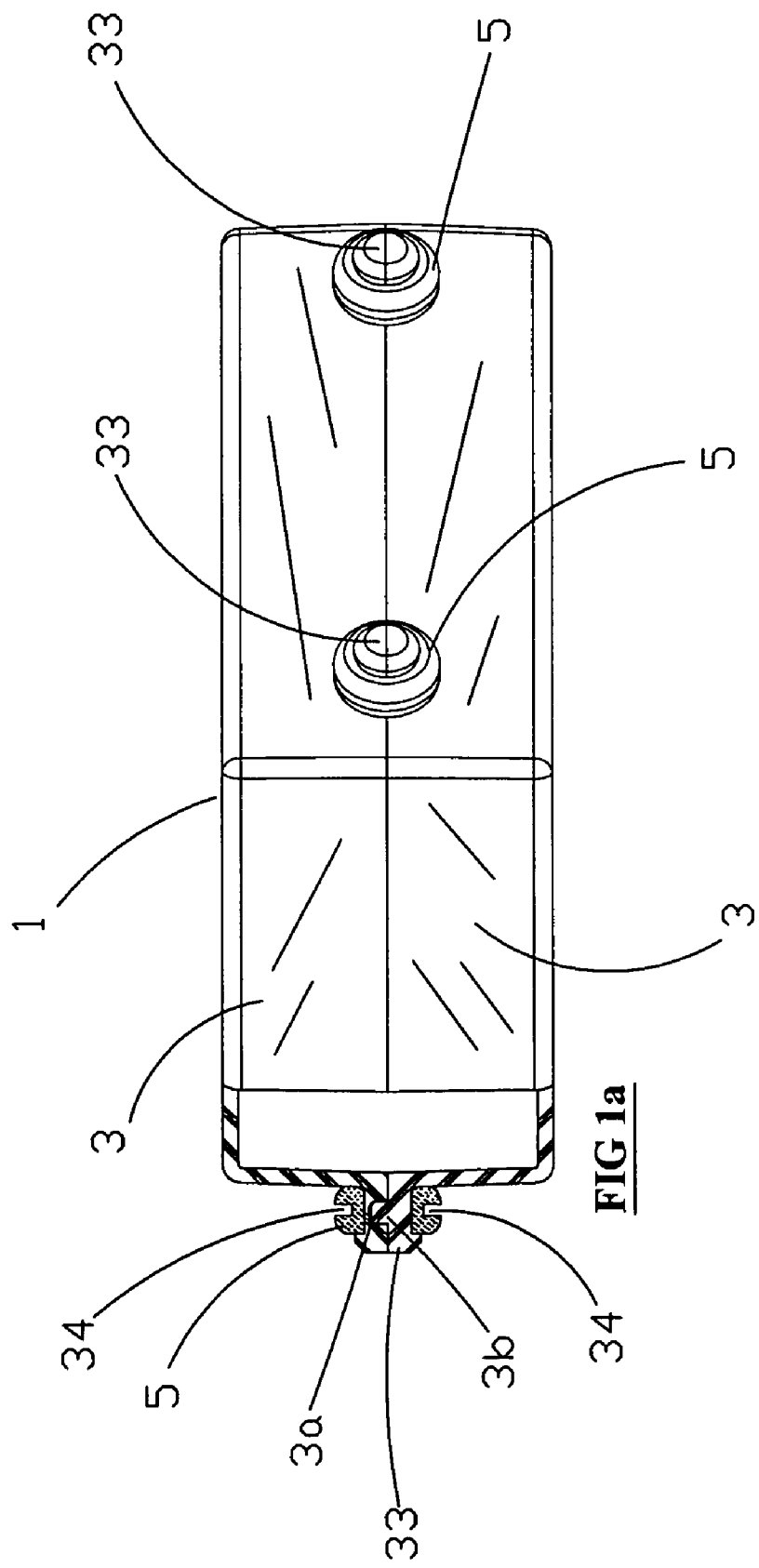
FIG. 1a is a sectional view, taken along the lines 1a-1a in FIG. 1, showing the vibration isolating mounting and the connection of halves of shell providing the housing of the modular light source head shown in FIG. 1.

Returning to FIG. 1, the head 1 has a housing 3 made out of two parts or halves, which may be open shells and are assembled by vibration isolating mounts provided by rubber grommets 5. These shells provide the housing 3. As shown in FIG. 1a, the housing shells have semi-circular tabs or stubs 3a and 3b with circular grooves 34 into which the grommet 5 fits when the shells are assembled together to form the housing 3. One of these stubs 3a has an alignment socket, while the other 3b has an alignment pin. There are four such generally semi-circular tabs 33 on each of the shells of the housing 3. When these stubs 3a and 3b are assembled in aligned relationship, with these sockets and pins interconnected, the grommets 5 slide over the ends of the stubs and elastically hold the halves of the housing 3 together.

Figure 2:
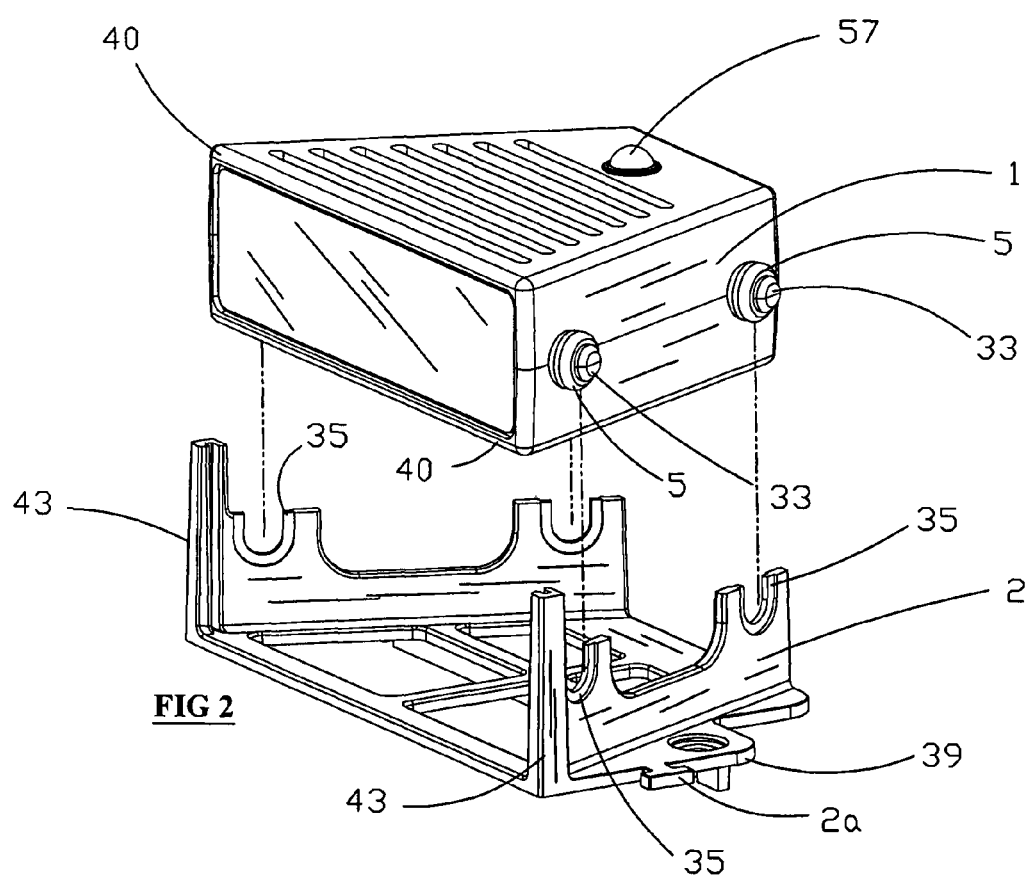
FIG. 2 is a perspective, exploded view showing the modular light source and a cage to which it is connected by a vibration isolating member.
Figure 7:
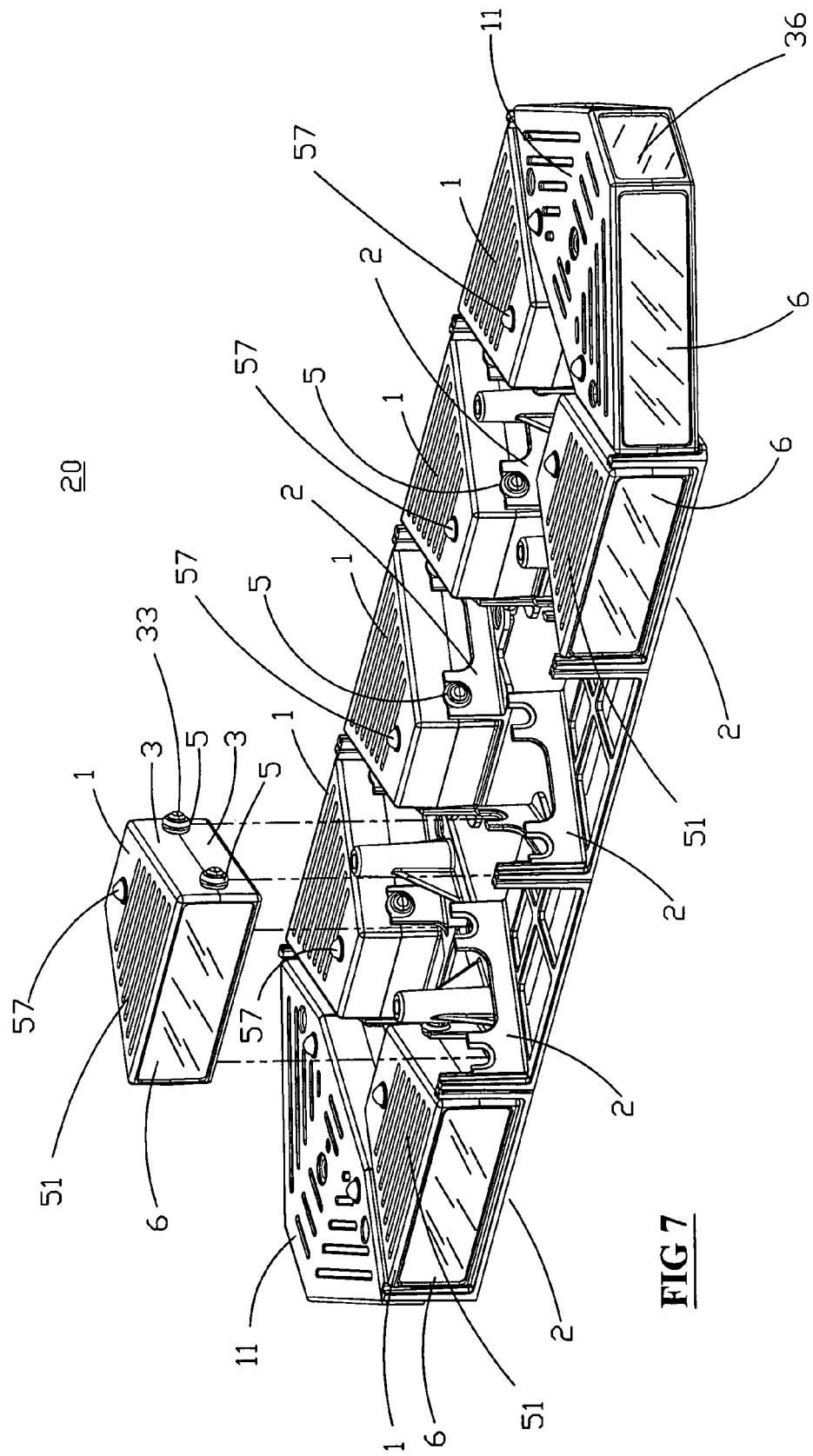
FIG. 7 is a perspective exploded view of the internals of a light bar having a compliment of modular light source head assemblies in accordance with the invention, the view being simplified by removal of the electrical connectors and connector board.

The grommets 5 provide vibration isolating or shock mounts for the light heads 1. The grommets have circular peripheral grooves 34 also best shown in FIG. 1a. These grooves are received in semi-circular slots 35 of the cage 2 as shown in FIG. 2, each with a semi-circular tongue 33 which fits into the grooves 34 of the grommets 5. The cages 2 are disposed in side by side relationship along the sides of the light bar 20 as shown in FIG. 7A and 7B. There are also cages 18 which are part of the end modular light source head assemblies at the opposite ends of the light bar, (see especially FIG. 13A). These end cages 18 have room for two light source heads 1 and may be equipped with one or two such heads, which are disposed in angular relationship to each other so as to project light through lenses 6 thereof and even through a center square lens 36 (see FIGS. 12, 13 and 13A). Cages 18 provided for the end modular light source assemblies 11 are shown in FIGS. 7, 7A, 8B, 8C, 8D, 8E, and 8F, and also in FIGS. 12, 13 and 13A. These cages 18 like the cages 2 are connected by screws, in ears 39 thereof, to the bottom member or extrusion 15 by fasteners 41, which extend through the ears 39 into the bottom member 15. The use of grommets 5 into semi-circular slots 35, along with the below described vibration isolation member 57, allows for tool free assembly of, addition of, or replaceability of light source modules once inside the light bar. This can be especially important once the light bar is installed on a vehicle and access to the light bar is limited.

As shown in FIG. 7B, an arrangement of locking alignment tabs and slots 2a in adjacent cages are provided to assemble these cages on the bottom member 15 in aligned relationship and extending linearly along the sides of the light bar 20. Alignment of the light heads 1 in their cages is also facilitated by the tongues 33 and the semi-circular slots 35. They can receive secondary lenses or color filter plates or signs signifying that the cages are empty. These signs, plates or lenses enter grooved posts 43 (see FIG. 2 and 7B), tongues 44 projecting out of the sides of the posts 43. Alignment of the cages 2 can further be facilitated by grooves in the extrusion providing bottom member 15, in which tongues projecting from the bottoms of the cages 2 extend.

The light source heads 1, which are adjacent to the end modular light source heads 11 are connected to and aligned by semi-circular tongued grooves on the cages similar to the tongued grooves 35 shown in FIG. 2. Assembly in these grooves is by shock mount grommets, as explained in connection with FIG. 2. The heads inside the end modular light source head assemblies are also shock mounted by similar grommets and semi-circular tongue groove arrangements. The design of the end modular light source head assemblies 11 and the cages 18 thereof will become more apparent from FIGS. 12 and 13.

The shells of the housing 3 are provided with ventilating slots 51 (see especially FIG. 3). The upper one of these housing shells is provided with an elastomeric, vibration isolating member 57 which snaps into a slot 58.

The end cages 18 have posts 49. Two posts 49 project upwardly from each end cage 18. These posts 49 have threaded holes into which fasteners, such as screws, are received after passing through the top member 14. The hemispherical shock isolating members 57 on the top of the end head modules 11 and each of the light source modules 1 is engaged by the top member 14 and provides elastic compressive force to enable the heads 1 to be sandwiched and thereby confined between the members 14 and 15.

Figure 8A:
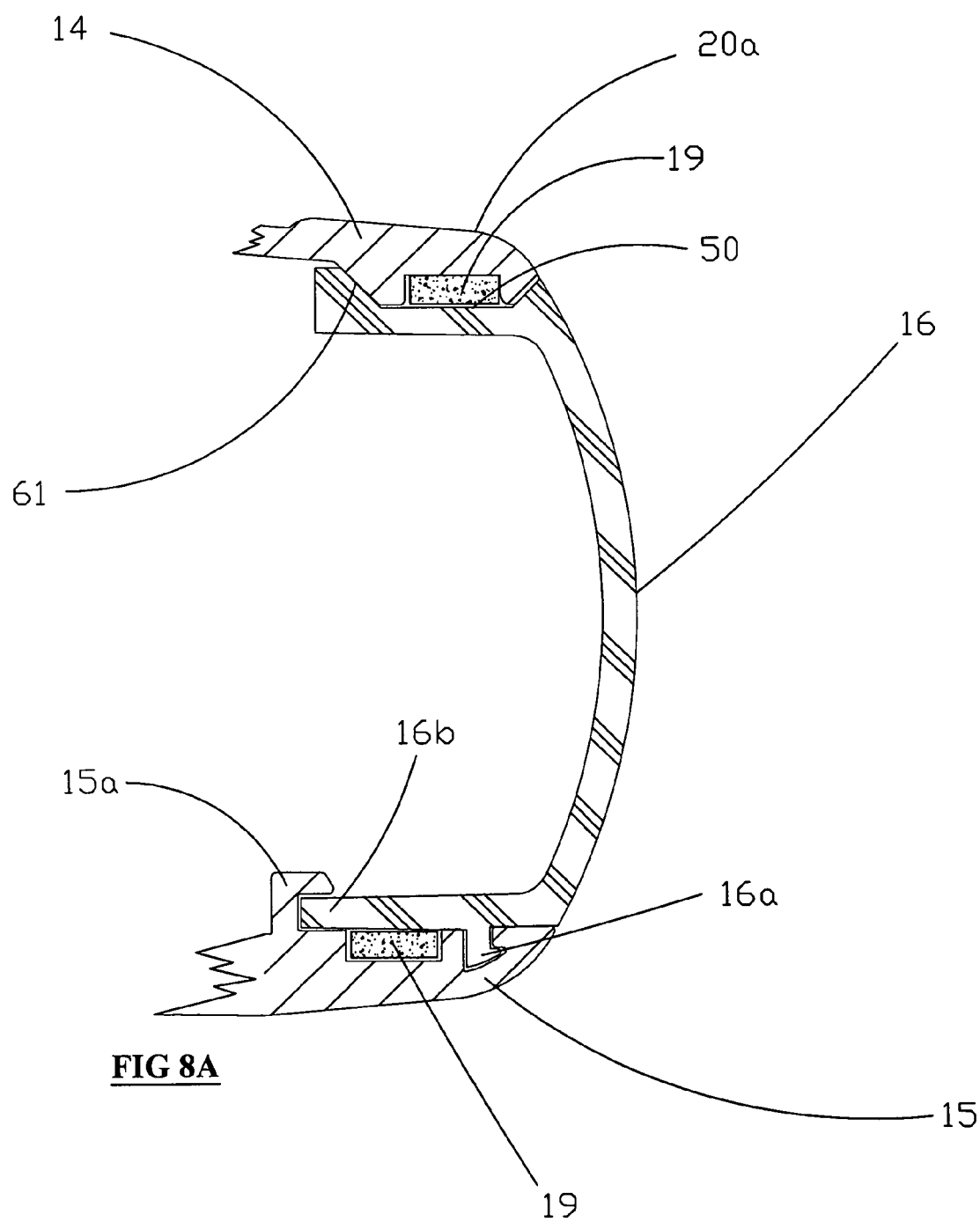
FIG. 8A is a fragmentary sectional view showing a side lens of the light bar illustrated in FIG. 8 and also showing the mounting of the lens between the bottom and top members of the light bar, the view being taken along line 8a-8a in FIG. 9.
Figure 8B:
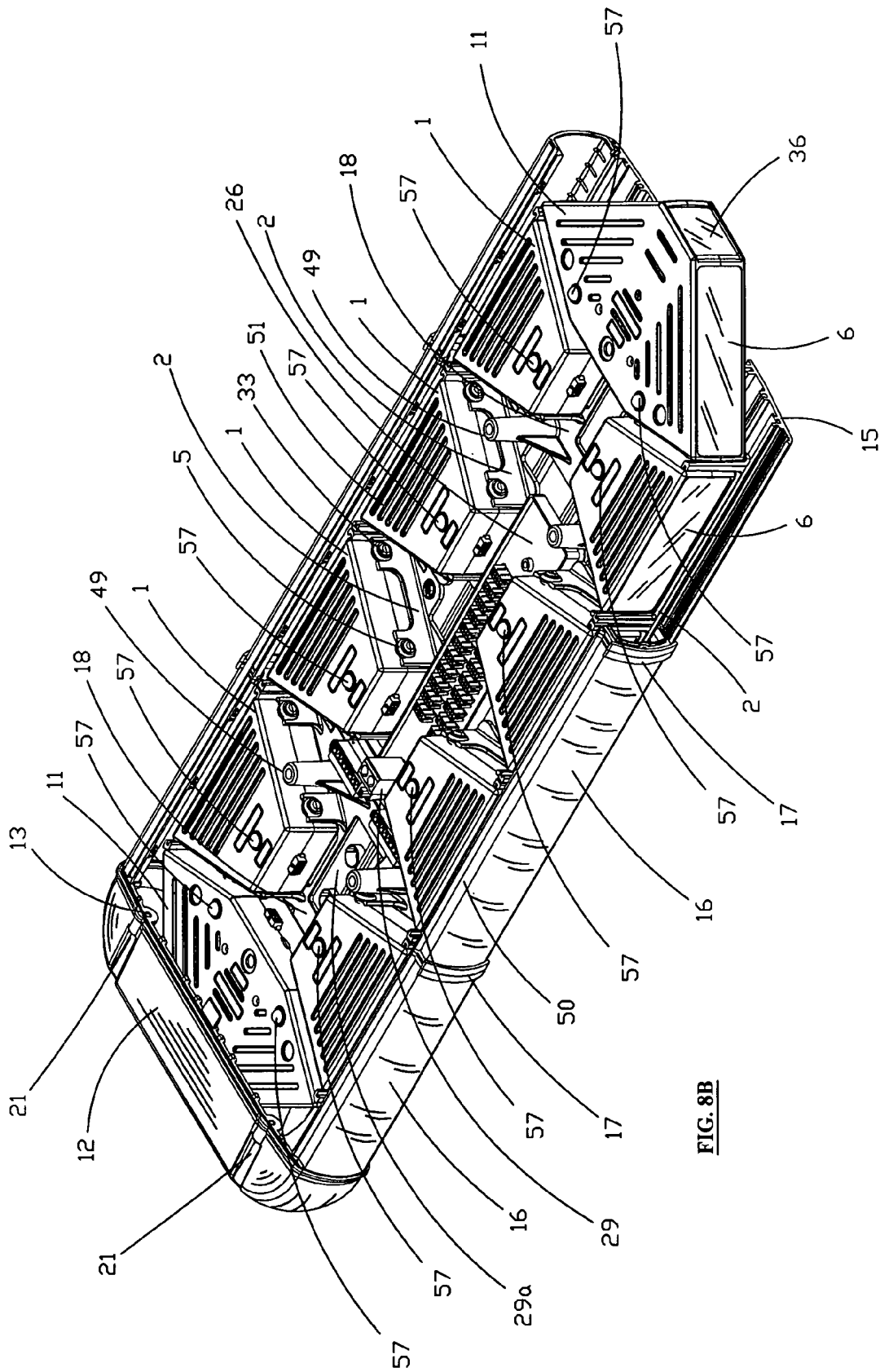
FIG. 8B is a perspective view of the light bar shown in FIG. 8 in assembled relationship, but with some of the side lenses and the top member removed and illustrating the connector board and its connectors, but without cabling between the connectors and the light source modules and from the connector board to the main cable which enters through the bottom member.
Figure 8C:
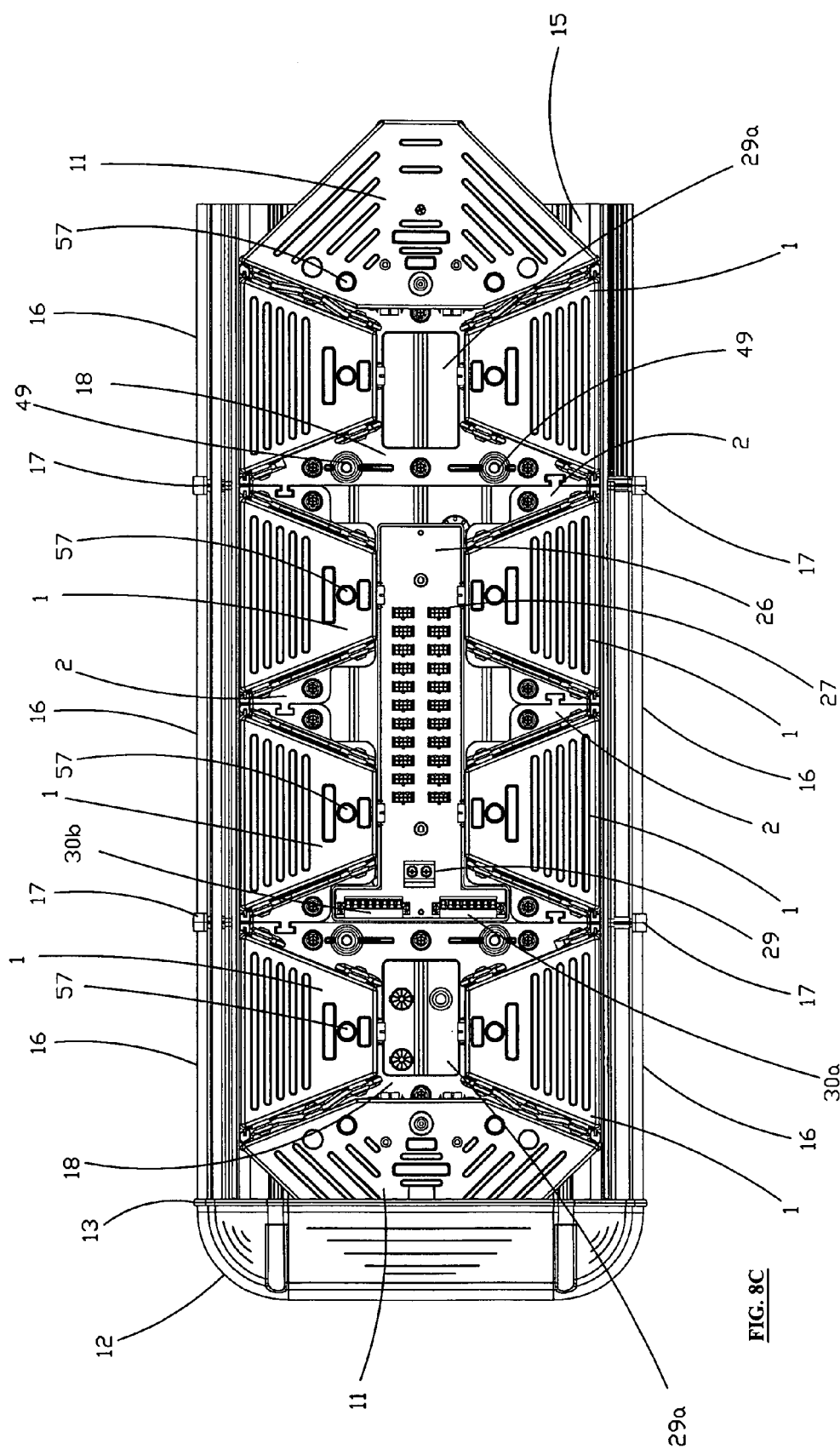
FIG. 8C is a plan view of the light bar shown in FIG. 8B.
Figure 8D:
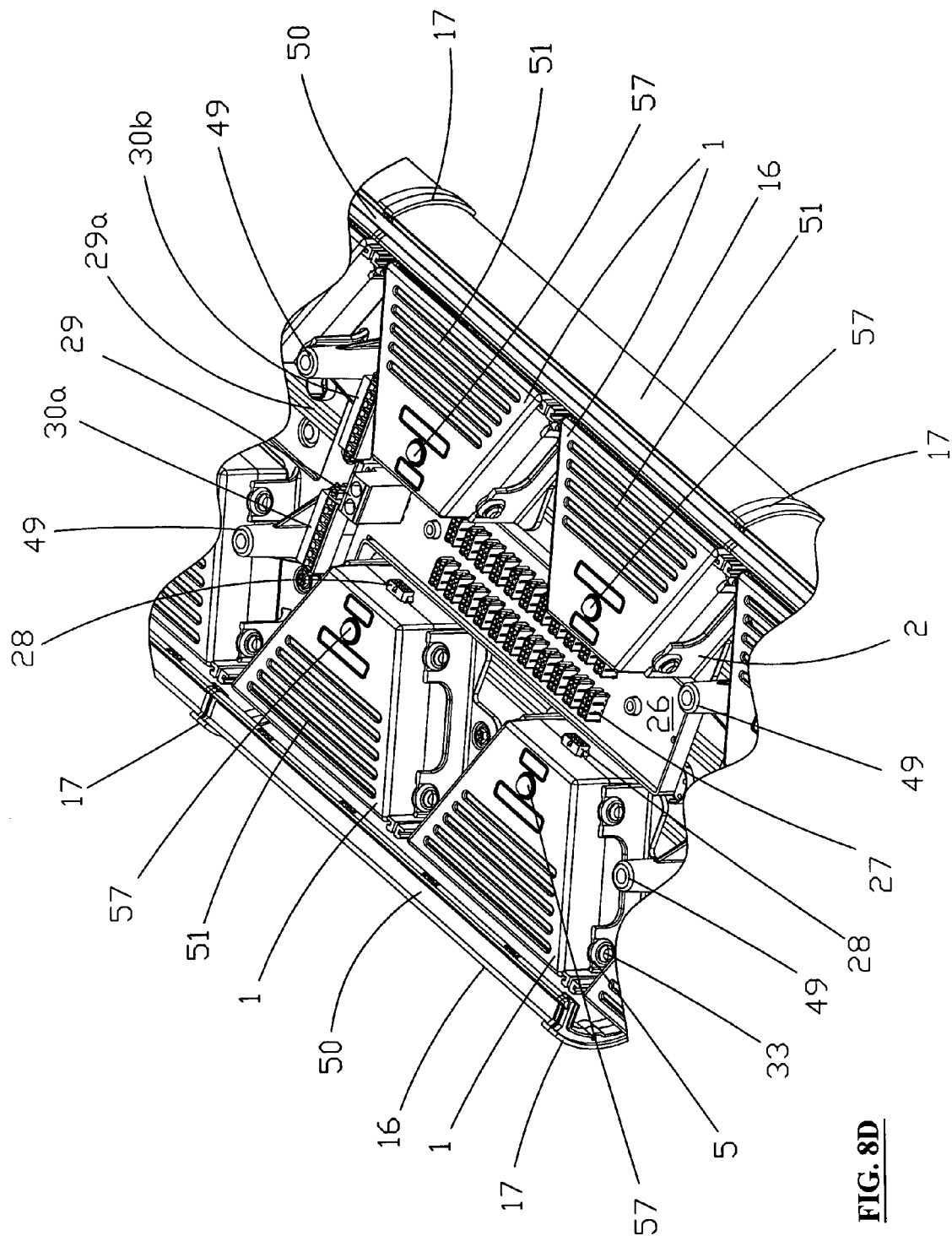
FIG. 8D is an enlarged, fragmentary, perspective view of FIG. 8B showing the modules around the connector board and the connector board as viewed from the top looking from the left to the right in FIG. 8B.
Figure 8E:
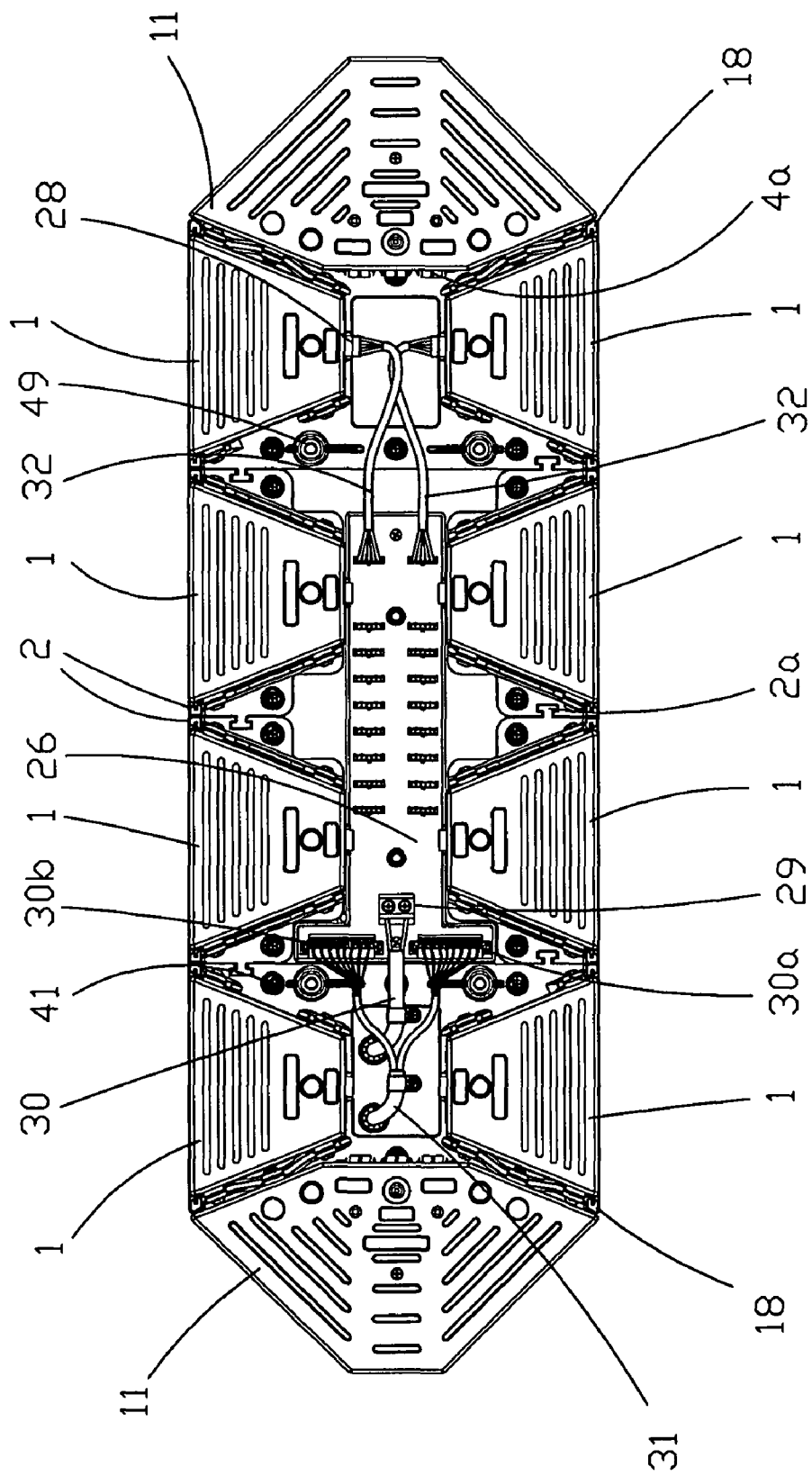
FIG. 8E is a plan view similar to FIG. 7A but showing the connector board and the cabling connected thereto.
Figure 8F:
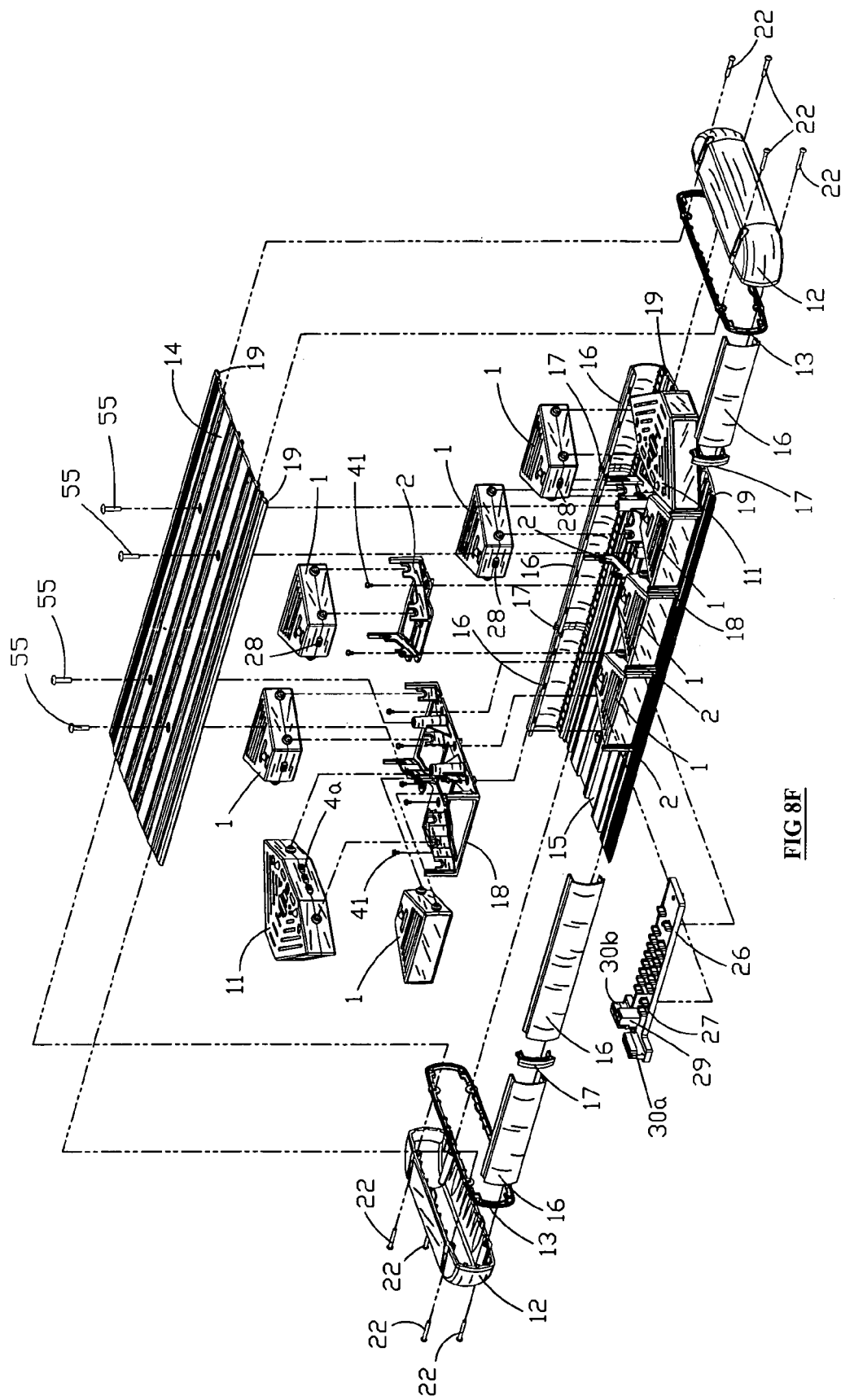
FIG. 8F is an exploded view similar to FIG. 7 but showing the connector board, the right end modular light source head assembly in mounted position in its cage and the left end modular light source head assembly and its mounting cage in exploded relationship.
Figure 12:
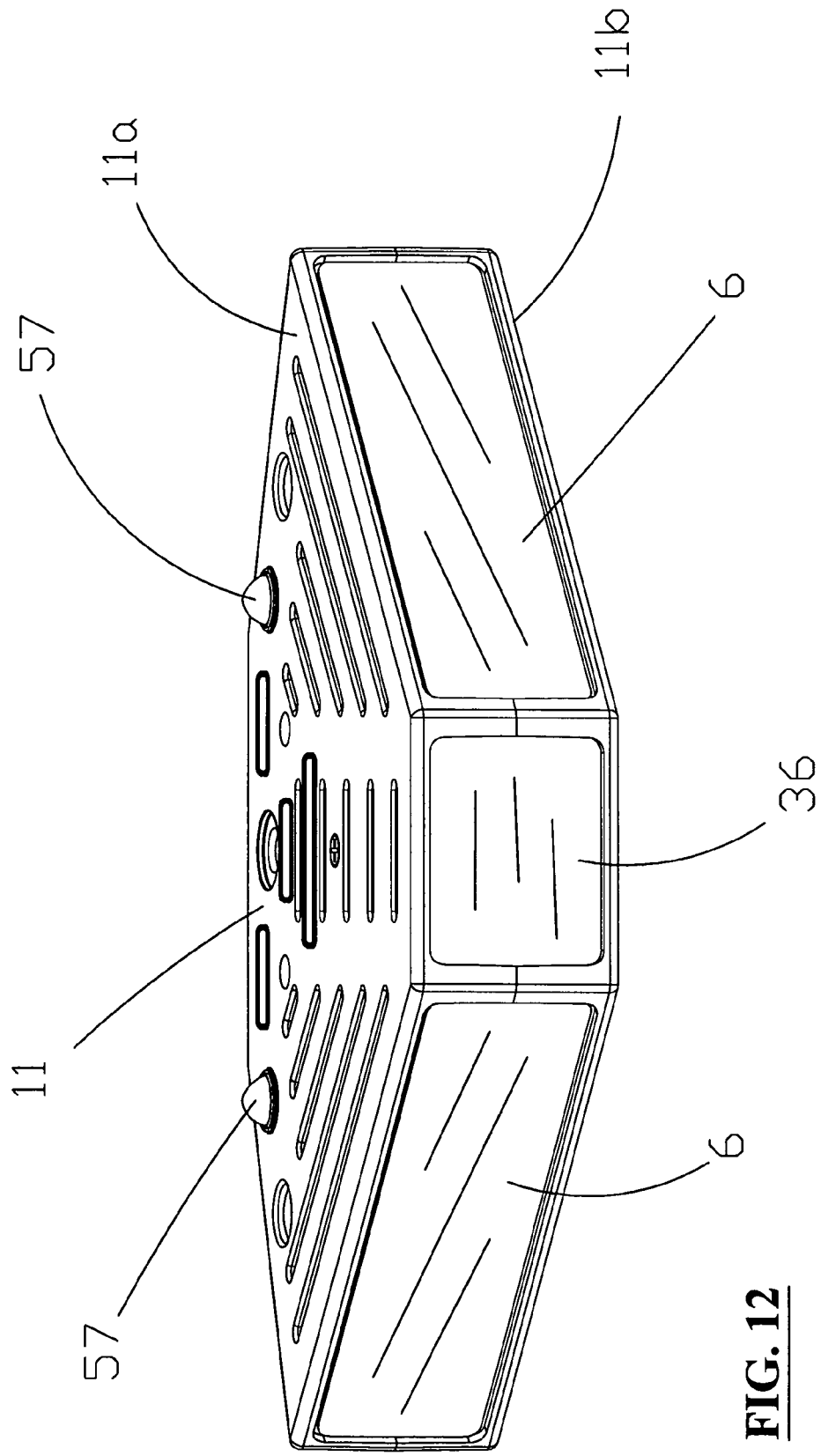
FIG. 12 is a perspective view similar to FIG. 1 but showing end modular light source head assembly.
Figure 13:
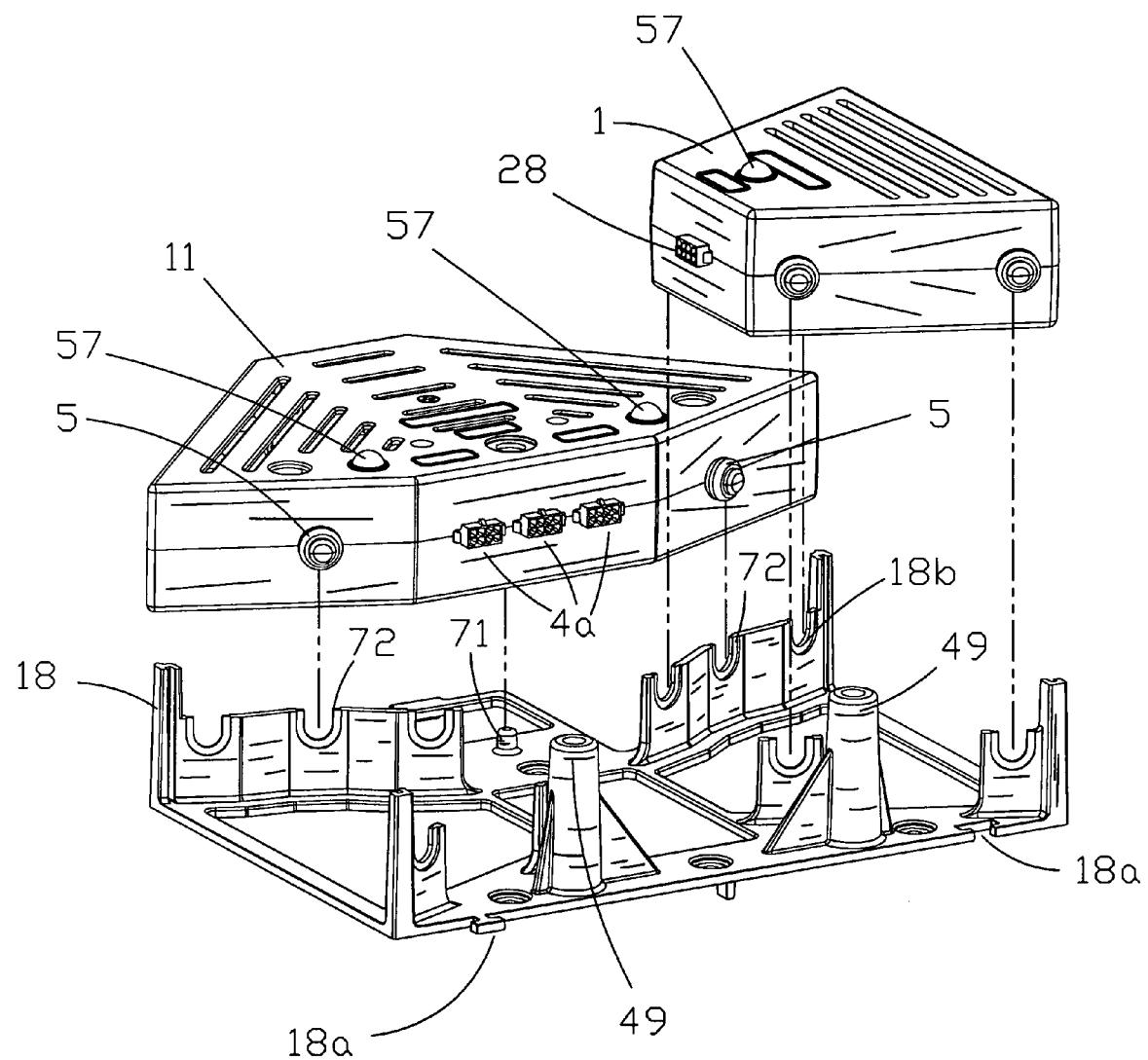
FIG. 13 is an exploded view similar to FIG. 2, but showing the end modular light source head assembly and cage.
Figure 13A:
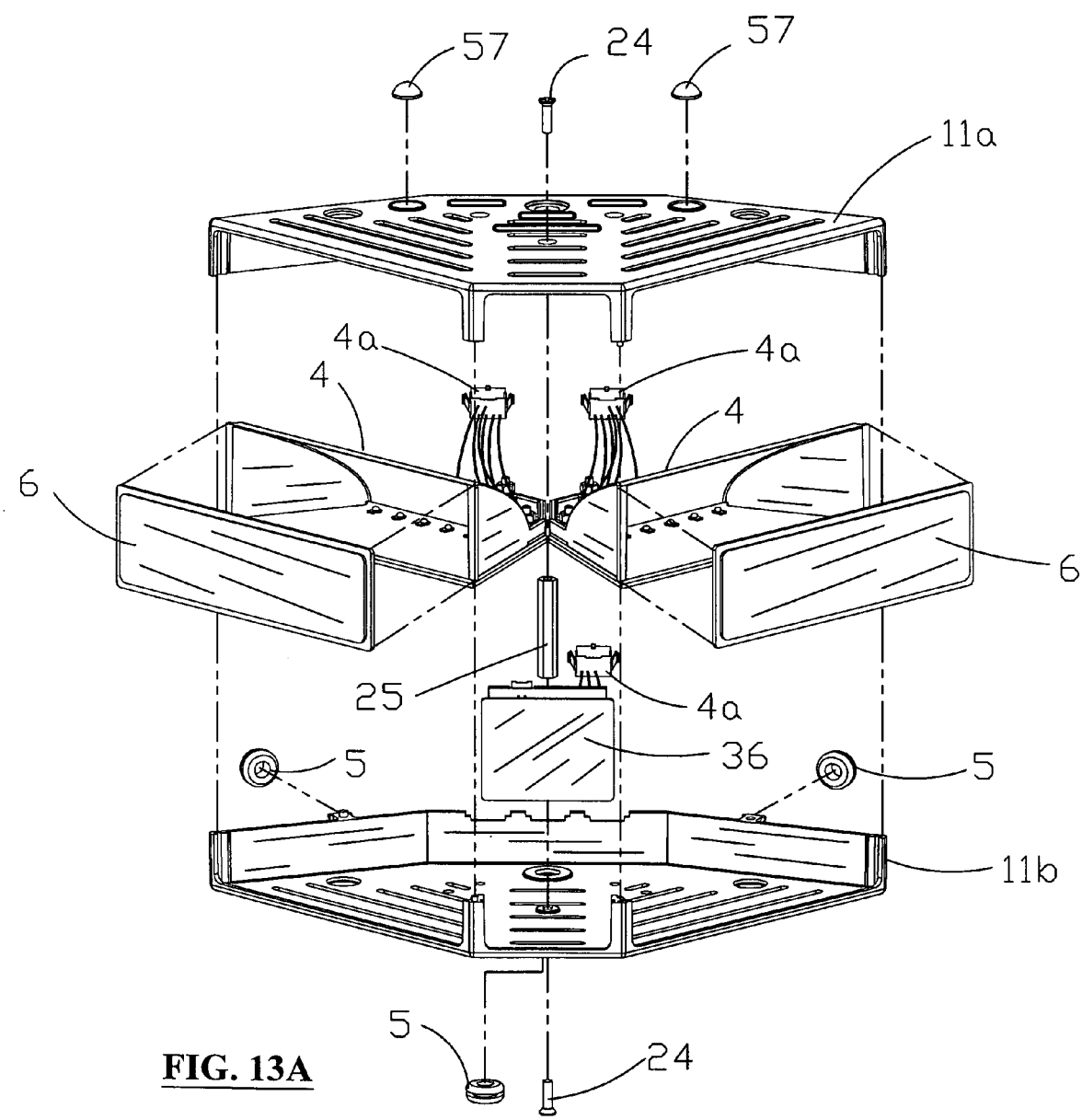
FIG. 13A is an exploded view of the end modular light source head assembly shown in FIG. 12.
Figure 13B:
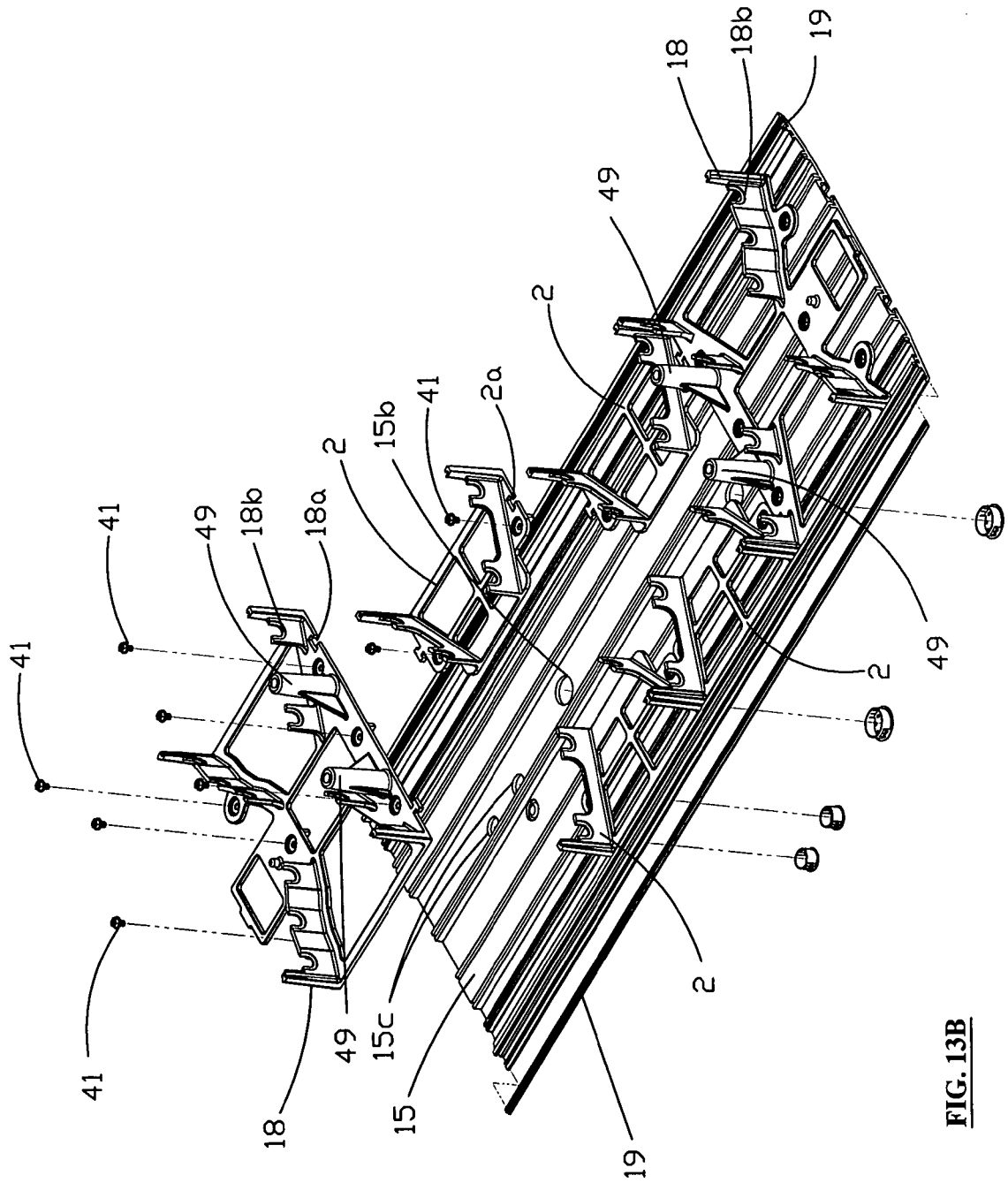
FIG. 13B is a partially exploded perspective view illustrating the cages for mounting the modular light sources and the end modular light source head assembly together with the bottom member and the sealing gaskets along the side edges of the bottom member.

The end modular light source assemblies 11 and their incorporation into light bar 20 will become still more apparent from FIGS. 12, 13, 13A and B as well as FIGS. 8E and 8F. A pair of interfitting shells 11a and 11b similar to the shells 3 of the light head modules are assembled in a manner comparable to the shells 3 of the light head modules 1 (see FIG. 3). The shells 11a and 11b are aligned by posts having interlocking tongues and grooves and are held together by aligned posts, similar to the post 33 (FIGS. 1a and 3). The grommets 5 slip over these posts and hold the shells 11a and 11b together.

There is room for several light source heads 1 in the end assemblies, they may be sources similar to those which may be present in cages 2. These sources are shown heads 1 by way of example as being of the type illustrated in FIG. 3. The sources have, at the front thereof, tongues which fit into grooves in the posts along the front edges of the shells 11a and 11b. In end modular light source assemblies 11, each source has a connector 4a (see especially FIG. 13A) and wiring similar to those associated with the connectors 28 described in connection with the light source heads 1.

In order to further secure the heads in the shells of the modules, a post 25 can be provided, which receives screws at the ends thereof and functions as a standoff so as to maintain the shells in spaced relationship as well as to secure the light head sources therein. It will be appreciated that other types of light sources than the sources shown in FIG. 3 may be used in the end modular assembly 11, for example the sources illustrated in FIGS. 4, 5, and 6.

To further secure the light source modules 4 in the shells of the end head assemblies 11, a grommet 5 may be located around the lower module and provide a shock mount in the bottom shell 11b as shown at 71 in FIG. 13. The shells have bumpers 57 and see also FIG. 8 and slits for ventilation.

As shown in FIG. 13, the cages 18 for the end assemblies 11 have semi-circular notches 72 with tongues into which the grooves on the grommets 5 enter to hold and align together with the posts 71, the assemblies 11. The cages 18 also have interlocking tabs and notches 18a, similar to notches 2a shown in FIG. 7B as well as tongued semi-circular notches for receiving the grooves in the grommets 5 of the light source heads 1, which are located at the ends of the sides of the light bar 20.

The cages 18 for the end light source head assemblies 11, and the location of the light source heads 1 at the ends of the row of light source heads 1 along the sides of the light bar are shown in FIG. 8F. FIG. 8E also shows the connector board 26 and the connectors therein, which connect to the connectors 28 of the side light head units 1 and the connectors 4a of the light head units in the end light source head assemblies 11. Some of the cables 32 between the connectors 28 and the connectors on the connector board 26 are shown in FIG. 8E, the cables between the other side head connectors 28 and the connectors on the connector board 26 are not shown to simplify the illustrations.

As noted above, a complete compliment of light source heads 1 filling the containment therefor in each cage, is not required. If a light source head is not present in its cage, it may be left empty, or a sign may be inserted in the grooves 44 in the posts 43 of that cage to indicate the lack of a light source therein.

The end caps 12 may be screwed in via screws 22 to the top and bottom members 14 and 15 and the internals of the light bar sealed with gaskets 13 through which the screws extend. The lenses 16 along the sides of the light bar are similarly sealed with gaskets. The lenses 16 may be in sections with clips 17 having grooves into which the ends of the lenses 16 fit. These clips, like the grooves, have a shape illustrated in FIG. 8A. At the bottom of each of the lens sections 16 and the clips, there is provided a bottom hook 16a. This hook fits into a corresponding hooked slot of the bottom member 15. The bottom member 15 also has a lip which provides a lens hook 15a into which the bottom edge of the lens 16 or a tab 16b extending therefrom fits. A gasket seals the lens 16 to the bottom member 15 for contaminate infiltration protection.

The upper end of the lens 16 and the clip 17 have indentations 50 of generally trapezoidal shape. These indentations are also shown in FIG. 8A. The top member 14 has a complimentary projection 61 which is complimentary to the indentation 50. This projection is along the bottom forward and rear edges of the top member 14. A strip of gasket material 19 fits into a slot on the underside of the projection 20A. When the top member is screwed on or otherwise fastened to the posts 49 in the cages 18 at the ends of the light bar and aligned, sealed connection is made between the lenses 16, the clip, and the top member 14. The optional gaskets 19 and 13 thereby seal the light bar against infiltration of contaminates in operation and effectiveness of the light bar.

Referring again to the views of the modular light source head assemblies having the different light sources shown in FIGS. 3, 4, 5 and 6, it will be noted that there is a tongue and groove connection 53a and 53b at the forward end of the housing with a tongue around the lens or other optical element 6 which is received at the end of the housing 3 and a groove 53a along the edges of the side walls of the housing. It will be appreciated that use of a lens or even a plate in the housing is optional. If a lens is used, it may be a Fresnel type lens which is amenable to being disposed on a generally rectangular body, such as the lens body 6.

Figure 5:
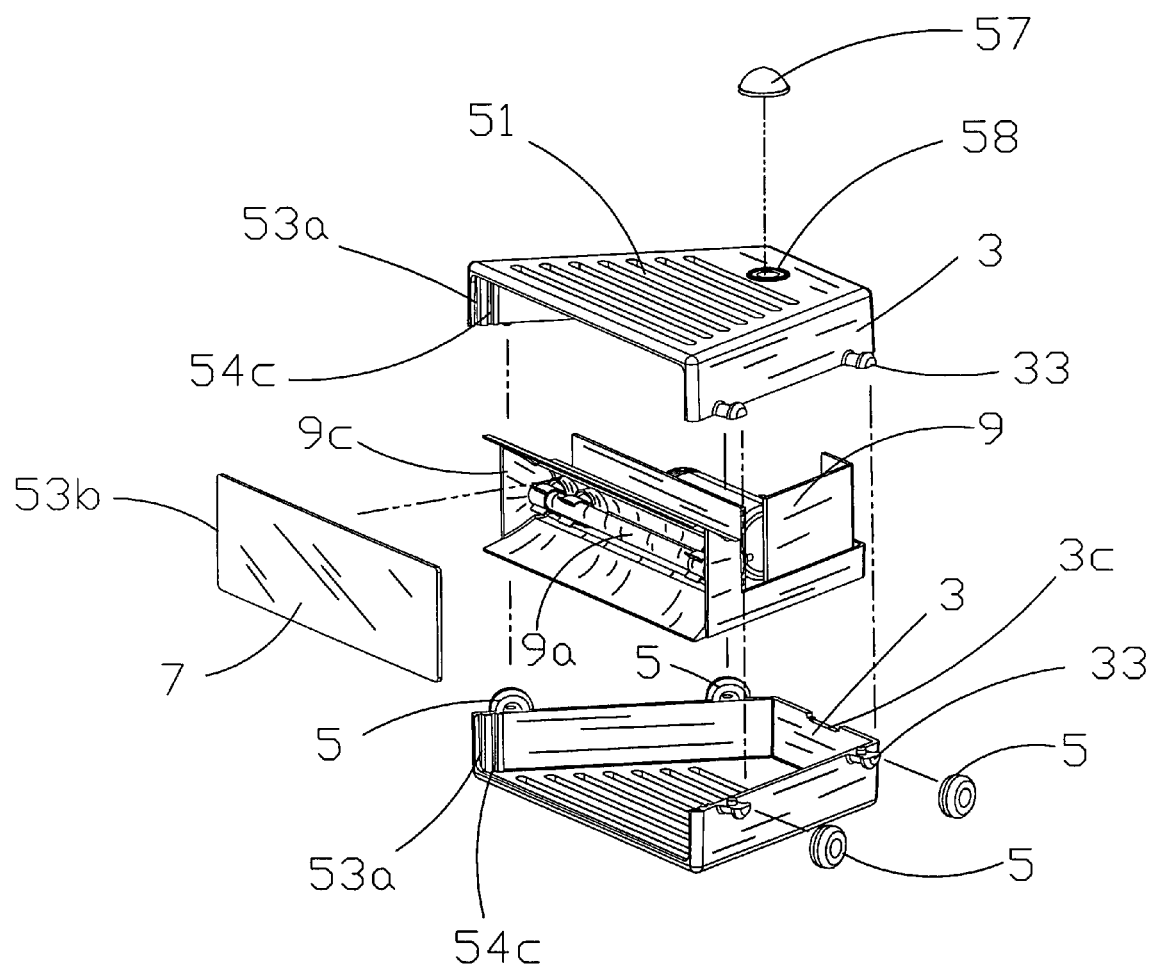
FIG. 5 is a perspective exploded view showing another different type of light source in a modular light source head in accordance with the invention, namely a linear Xenon strobe light source with its operating assembly.

In FIG. 5, the lens 7 may for example be a colored plate or filter also known as a strobe filter or color lens.

Figure 4:
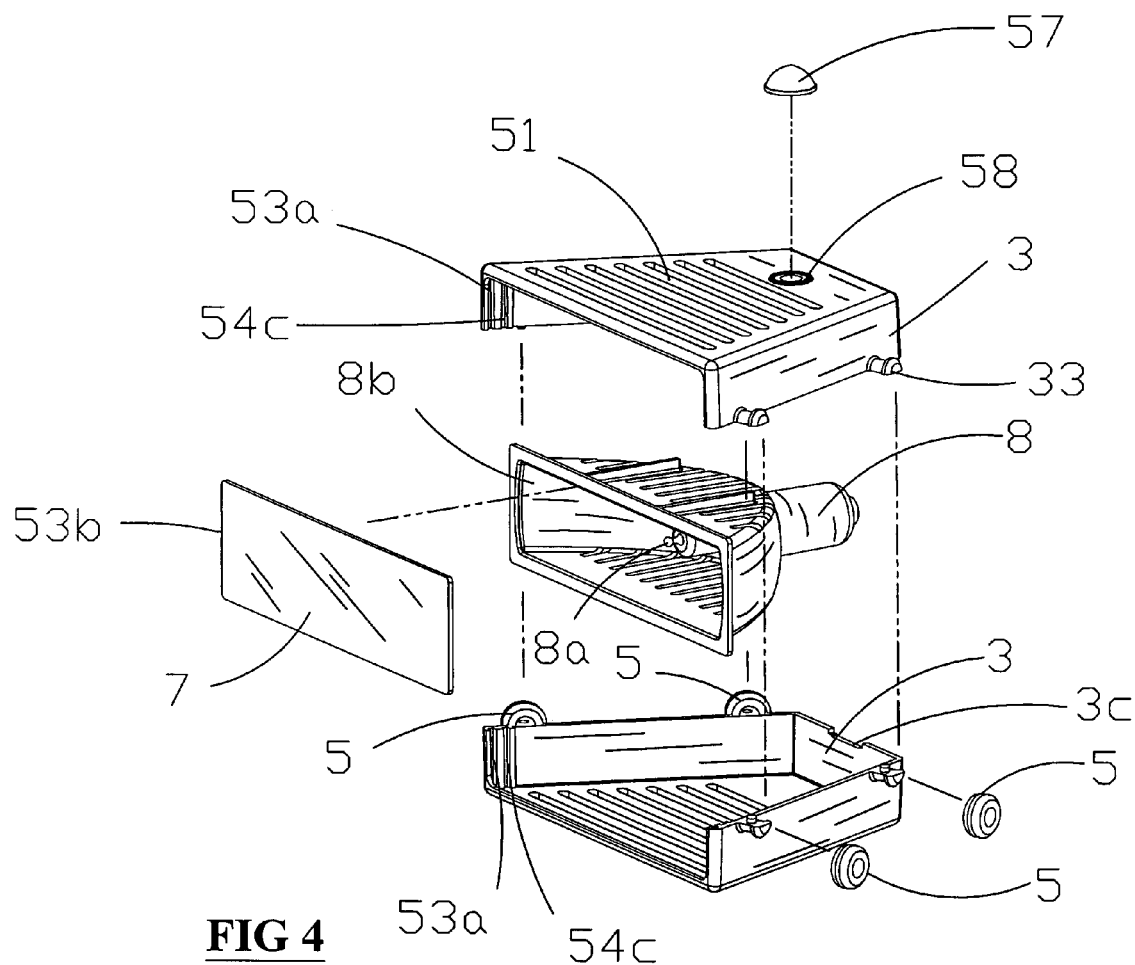
FIG. 4 is a perspective exploded view of a modular light source head having a different type of light source than shown in FIG. 1, namely a halogen bulb light source with its operating assembly.

The halogen lamp 8a in FIG. 4 is at the end of a halogen light source assembly 8 which contains the circuitry operating the halogen lamp. A connector similar to the connector 28 shown in FIG. 3 may be used which also extends through a slot 3c in the clam shells of the housing 3.

FIG. 5 has a linear Xenon strobe lamp 9a within a compartment 9c with reflective walls. The power supply and other circuitry for operating the lamp 9a is part of the light source assembly, the connector to the light source assembly is not illustrated in FIG. 5 since it has already been illustrated in FIG. 3.

Figure 6:
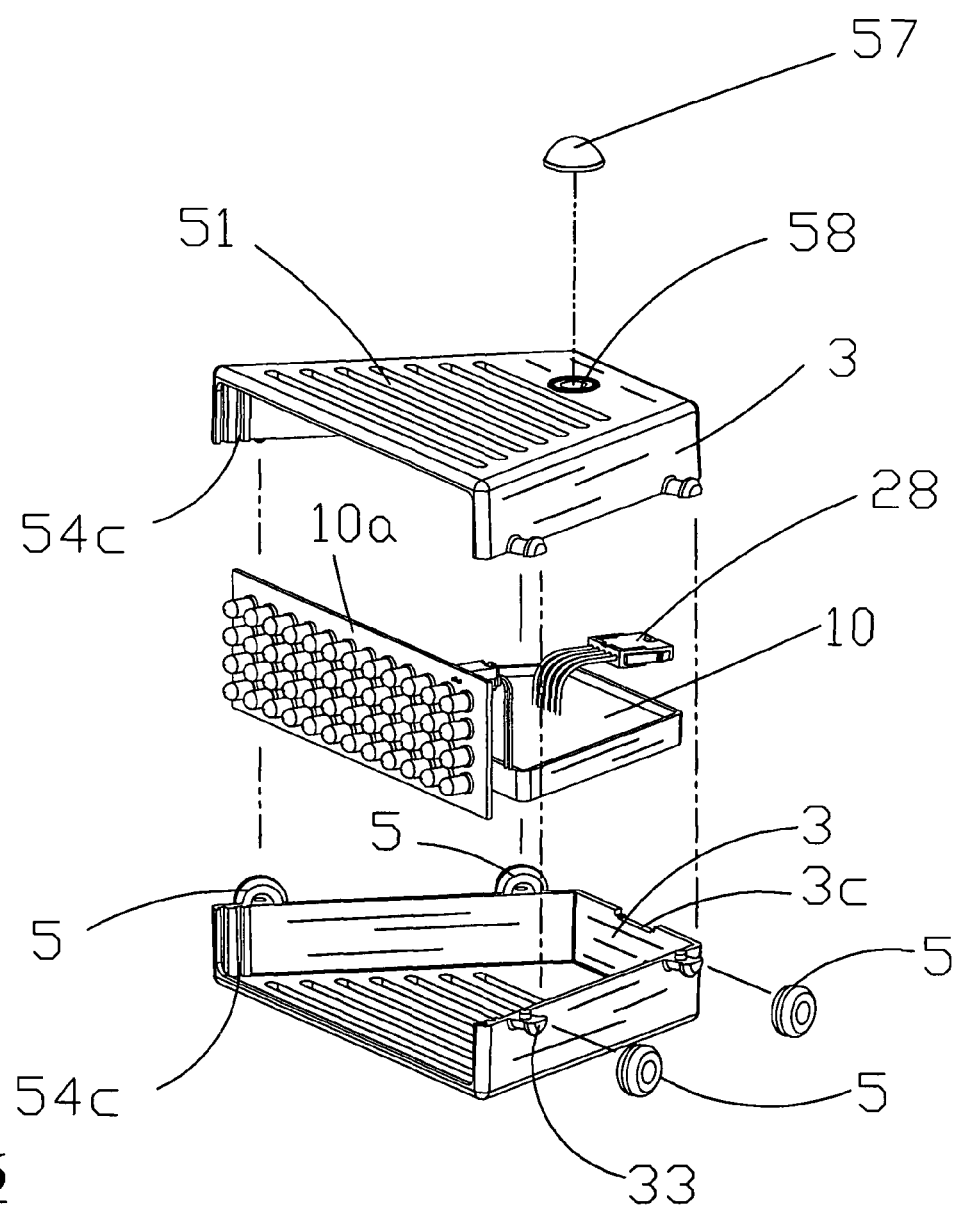
FIG. 6 is an exploded view of a modular light source head having still another different type of light source, namely an LED array.
Figure 6A:
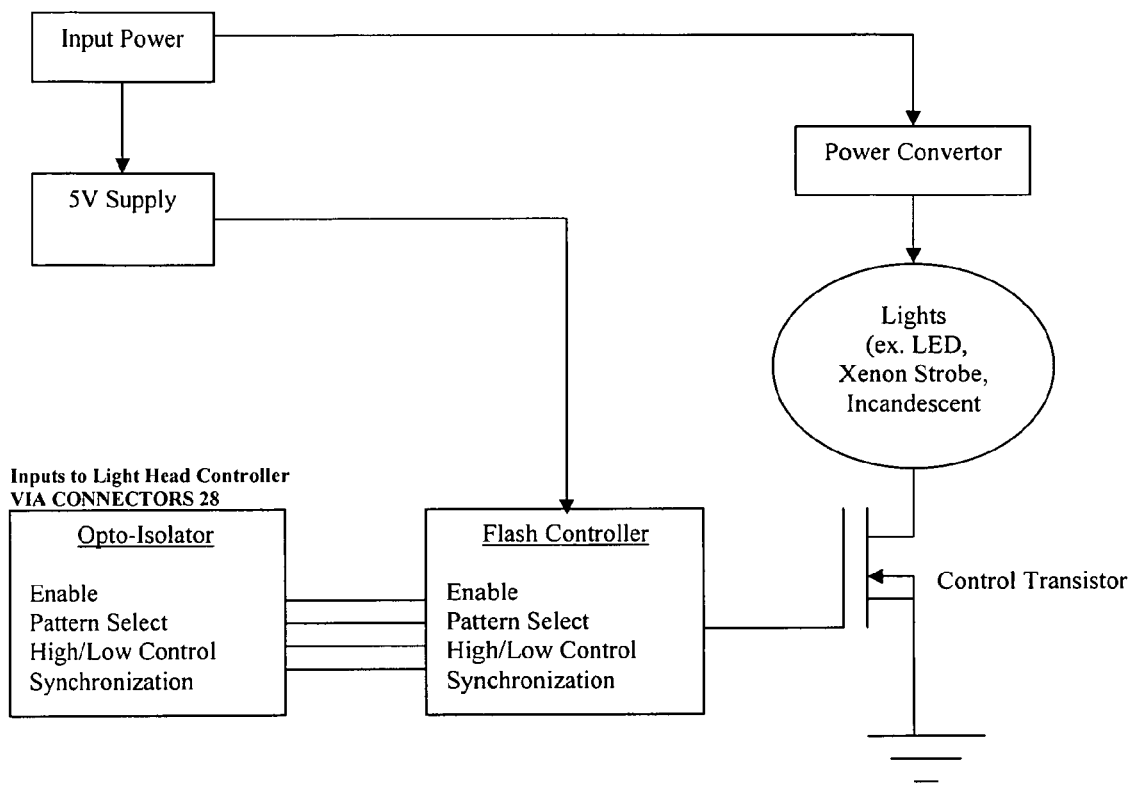
FIG. 6A is a functional block diagram of the circuitry in each modular light source.

In FIG. 6 an LED array is mounted as part of a light source assembly 10 in the clam shell housing 3. Alignment grooves 54c adjacent to the grooves 53a may be used to align the LED array board 10a in the clam shell housing 3. Similarly, alignment grooves 54c may be used to align the light source assembly 4 with the parabolic mirror 25 as shown in FIG. 3 and the reflective housing 8b for the halogen lamp assembly 8.

Figure 14:
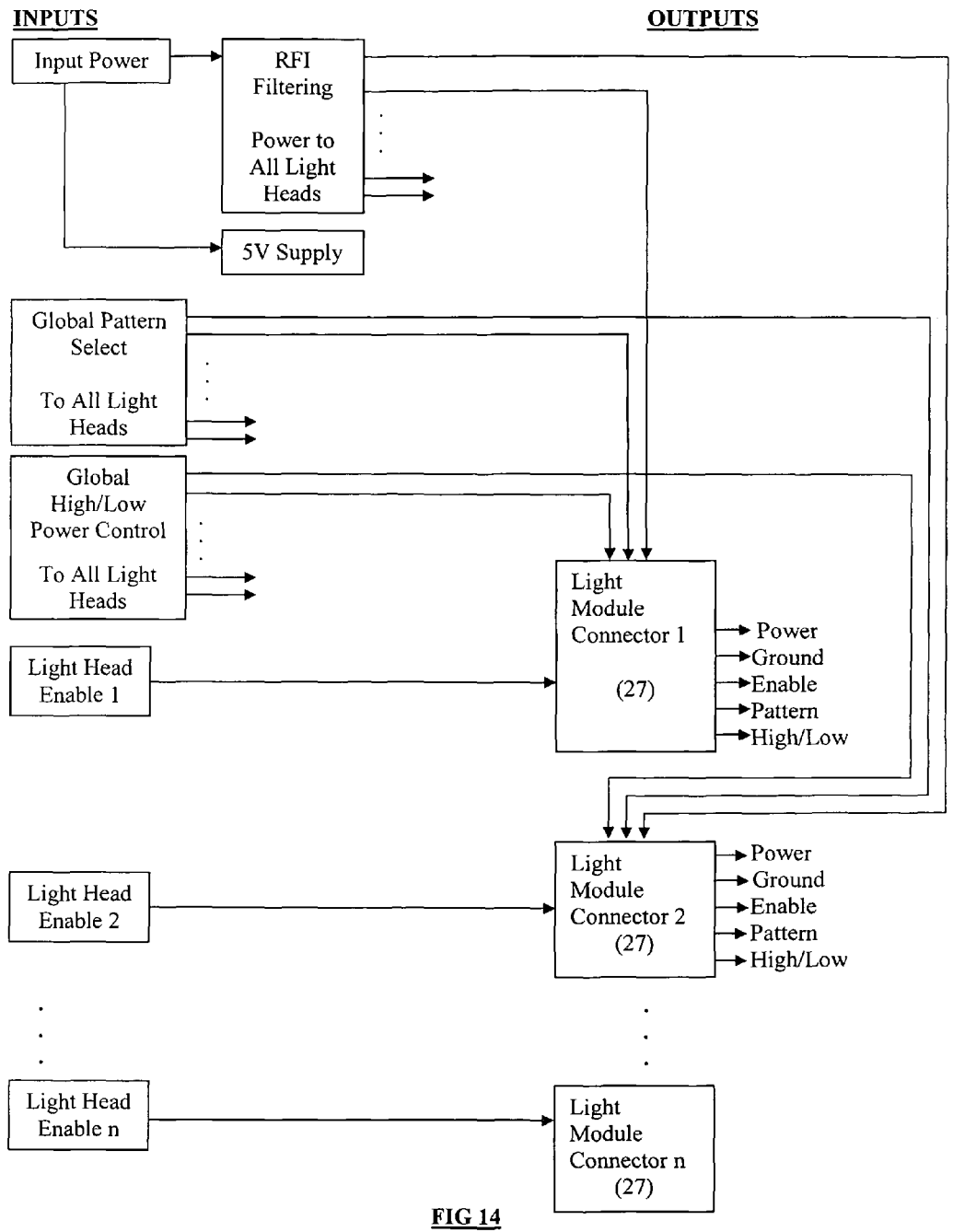
FIG. 14 is a block diagram of the circuitry on the connector board shown in FIGS. 8B, 8C, 8D, 8E, and 8F.

The circuitry on the connector board 26 is shown in the block diagram illustrated in FIG. 14. The same circuitry is used to provide for the command signal structure which operates the various independent light source heads 1. However, there are no power supply components on the connector board 24. All such power supply components are in the various light source assemblies of the heads 1. Thus, if one light source assembly power supply fails, the other light source can continue operating thereby providing greater flexibility and reliability.

From the foregoing description it will be apparent that there has been provided an improved light bar having features of construction, accessibility, reliability, and independence of operation of different types of light sources. Variations and modifications in the herein described light bar will undoubtedly become apparent to those skilled in the art. Accordingly, the foregoing description should be taken as illustrative and not in a limiting sense.

The invention claimed is:

1. A light bar comprising top and bottom members, a plurality of independent and interchangeable modular light source heads interchangeably disposed in cages disposed between said top and bottom members, and further comprising a plurality of spaced studs projecting from each of said modular light source heads into respective receptacles on said cages, and vibration isolating members on said studs received in said receptacles between said studs and spacing said studs and said receptacles from each other in vibration isolating relationship.

2. A light bar comprising top and bottom members, a plurality of independent and interchangeable modular light source heads interchangeably disposed in cages disposed between said top and bottom members, wherein said cages each have a plurality of grooves providing receptacles in which projections from said modular light source heads are removably received in vibration isolating relationship, said top member removably engaging said modular light source heads and holding said modules in said receptacles.

3. The light bar according to claim 2 further comprising vibration isolating members on said modular light source heads engagable with said top member when said top member engages said modules via said vibration isolating members and captures said modular light source heads in said receptacles in said cages.

4. The light bar according to claim 3 wherein the vibration isolating relationship between said projections and said receptacles is provided by grommets of elastic material.

5. The light bar according to claim 4 wherein said grommets have peripheral grooves and said receptacles are semi-circular slots having peripheral tongues which provide with said grooves tongue and groove connections between said projections and said receptacles which assemble said cages and said modular light source heads in vibration isolating relationship.

6. The light bar according to claim 4 wherein said modular light source heads have housings provided by shells, said projections being provided by semi-circular stubs extending outwardly from edges of said shells which edges and stubs engage each other when said shells are assembled in closed relationship to provide said housings with circular stubs provided by said semi-circular stubs providing said projections, said semi-circular stubs have peripheral grooves which are aligned when said circular stubs are provided when said shells are closed to define circular peripheral grooves, and said grommets being disposed around said circular stubs in said circular grooves to elastically attach said shells to provide said housings.

* * * * *

UNITED STATES PATENT AND TRADEMARK OFFICE
CERTIFICATE OF CORRECTION

| | |
|---|---|
| PATENT NO. | : 8,210,725 B2 |
| APPLICATION NO. | : 12/378247 |
| DATED | : July 3, 2012 |
| INVENTOR(S) | : Datz et al. |

It is certified that error appears in the above-identified patent and that said Letters Patent is hereby corrected as shown below:

Title Page, item (73) Assignee: delete "Start Headlight & Lantern Co., Inc." and insert --Star Headlight & Lantern Co., Inc.--

Signed and Sealed this
Sixteenth Day of October, 2012

David J. Kappos
*Director of the United States Patent and Trademark Office*